(12) United States Patent
Yan et al.

(10) Patent No.: US 11,302,487 B2
(45) Date of Patent: Apr. 12, 2022

(54) LITHIUM-ION CAPACITOR

(71) Applicant: GENERAL CAPACITOR, LLC, Tallahassee, FL (US)

(72) Inventors: Jin Yan, Tallahassee, FL (US); Wanjun Ben Cao, Tallahassee, FL (US); Xujie Chen, Tallahassee, FL (US); William Brandt, Tallahassee, FL (US)

(73) Assignee: SPEL TECHNOLOGIES PRIVATE LIMITED, Pune (IN)

( * ) Notice: Subject to any disclaimer, the term of this patent is extended or adjusted under 35 U.S.C. 154(b) by 0 days.

(21) Appl. No.: 16/005,777

(22) Filed: Jun. 12, 2018

(65) Prior Publication Data

US 2018/0374656 A1 Dec. 27, 2018

Related U.S. Application Data

(60) Provisional application No. 62/524,884, filed on Jun. 26, 2017.

(51) Int. Cl.
| | |
|---|---|
| *H01G 11/06* | (2013.01) |
| *H01G 11/52* | (2013.01) |
| *H01G 11/86* | (2013.01) |
| *H01G 11/34* | (2013.01) |
| *H01G 11/38* | (2013.01) |
| *H01G 11/62* | (2013.01) |
| *H01G 11/28* | (2013.01) |
| *H01G 11/32* | (2013.01) |
| *H01G 11/50* | (2013.01) |

(52) U.S. Cl.
CPC .............. *H01G 11/06* (2013.01); *H01G 11/28* (2013.01); *H01G 11/32* (2013.01); *H01G 11/34* (2013.01); *H01G 11/38* (2013.01); *H01G 11/50* (2013.01); *H01G 11/52* (2013.01); *H01G 11/62* (2013.01); *H01G 11/86* (2013.01)

(58) Field of Classification Search
CPC ........ H01G 11/06; H01G 11/28; H01G 11/32; H01G 11/34; H01G 11/38; H01G 11/50; H01G 11/52; H01G 11/62; H01G 11/86
USPC .......................................................... 361/502
See application file for complete search history.

(56) References Cited

U.S. PATENT DOCUMENTS

2016/0141596 A1* 5/2016 Uhm ..................... H01M 4/139
429/220

* cited by examiner

*Primary Examiner* — Michael P McFadden
(74) *Attorney, Agent, or Firm* — Richard D. Clarke

(57) ABSTRACT

A lithium-ion capacitor (LIC) is provided which includes positive electrodes, negative electrodes pre-loaded on surface with lithium sources including lithium strips and ultra-thin lithium films having holes, separators and organic solvent electrolyte with lithium salt for high performance including high energy density, high power density, long cycle life, long DC life and wide temperature ranges. A method for making an LIC is also provided, where cell components important to optimize the electrochemical performance of LIC's are configured, said components include PE active material and binders, NE active material and binders, thickness/mass ratio of positive electrode (PE) to negative electrode (NE) active layers, PE and NE's size designs and layer numbers, types of material for Separators and NE pre-lithiation methods, NE pre-lithiation includes loading various lithium (Li) sources including lithium strips and ultra-thin lithium films having holes onto the surface of NE.

38 Claims, 23 Drawing Sheets

SC

J2

Positive Electrode

Negative Electrode

FIG. 19    Table 2

| CELL | C (F) (1C) | ESR (mohm) (50C) | RC (s) | Thickness (mm) | Height (mm) | Width (mm) | Weight (g) | Specific Energy (Wh/kg) | Energy Density (Wh/L) | Max. Specific Power (kW/kg) | Max. Power Density (kW/L) | 100,000 Cycles under 50C Rate Capacitance % | 100,000 Cycles under 50C Rate ESR % | 2,000h DC life under 3.8 V at 65°C Capacitance % | 2,000h DC life under 3.8 V at 65°C ESR % |
|---|---|---|---|---|---|---|---|---|---|---|---|---|---|---|---|
| A1 | 220 | 26 | 5.5 | 4.9 | 50 | 49 | 21.0 | 14.0 | 24.9 | 6.9 | 12.3 | 89 | 119 | 93 | 130 |
| A2 | 237 | 22 | 5.2 | 5.2 | 50 | 49 | 21.4 | 14.7 | 25.3 | 7.7 | 13.1 | 93 | 114 | 97 | 117 |
| A3 | 231 | 22 | 5.1 | 5.6 | 50 | 49 | 23.1 | 13.3 | 22.9 | 7.1 | 12.2 | 81 | 129 | 90 | 140 |
| A4 | 245 | 22 | 5.4 | 5.8 | 50 | 49 | 28.0 | 13.6 | 23.4 | 6.8 | 11.8 | 82 | 135 | 89 | 163 |
| A5 | 281 | 16 | 3.9 | 5 | 50 | 49 | 21.3 | 15.1 | 26.8 | 10.6 | 18.8 | 83 | 133 | 86 | 144 |
| A6 | 312 | 23 | 7.2 | 5.9 | 50 | 49 | 28.2 | 17.2 | 29.3 | 6.5 | 11.1 | 87 | 119 | 95 | 113 |
| A7 | 368 | 28 | 10.3 | 6.3 | 50 | 49 | 24.7 | 19.9 | 32.5 | 5.2 | 8.5 | <80, FAIL | FAIL | <80, FAIL | FAIL |
| A8 | 3238 | 1.8 | 5.8 | 4.8 | 237 | 126 | 253.5 | 17.0 | 30.1 | 7.9 | 14.0 | 91 | 102 | 93 | 110 |
| A9 | 3238 | 2.1 | 6.7 | 4.4 | 237 | 126 | 257.3 | 18.8 | 32.6 | 6.7 | 13.1 | <80, FAIL | FAIL | <80, FAIL | FAIL |
| A10 | 3152 | 2.3 | 7.2 | 5.6 | 237 | 126 | 288.6 | 14.6 | 25.1 | 5.4 | 9.4 | 86 | 122 | 88 | 120 |
| A11 | 3158 | 1.8 | 5.7 | 5.8 | 132 | 105 | 239.0 | 17.6 | 31.0 | 8.4 | 14.8 | 89 | 111 | 92 | 111 |
| B1 | 329 | 21 | 4.8 | 4.9 | 50 | 49 | 21.0 | 14.5 | 25.9 | 8.2 | 14.6 | 94 | 108 | 94 | 112 |
| B2 | 3361 | 1.6 | 5.4 | 4.8 | 237 | 126 | 282.4 | 17.8 | 31.3 | 8.9 | 15.7 | 93 | 101 | 93 | 107 |

FIG. 20  Table 3

LITHIUM-ION CAPACITOR

FIELD OF THE INVENTION

The present invention relates to lithium-ion capacitors (LICs) that include positive electrodes, negative electrodes pre-loaded on surface with lithium sources including lithium strips and ultra-thin lithium films (u-Li) having holes, separators and organic solvent electrolyte with lithium salt for high performance including high energy density, high power density, long cycle life and long DC life.

BACKGROUND OF THE INVENTION

In 1827, the concept of powering a vehicle with electricity was mentioned by Slovak-Hungarian priest Anyos Jedlik for the first time. However, due to the limitation of technology and production method, the first generation of electric vehicle (EV) production line introduced by General Motors was stopped after a few years of marketing. During the last few decades, environmental issues have drawn a huge attention to the world, such as petroleum-based transportation infrastructure. The fear of peak oil also makes researchers reconsider the development of EVs, Hybrid and plug-in EVs have won lots of markets in last few years. From 1997 to April 2016, over 11 million hybrid EVs have been sold all over the world, while the global sale of plug-in EVs in the same period is 1.5 million.

Compared to currently used battery packs, supercapacitors always have a much higher power density. That is to say, they can provide power far more quickly than existing battery technology. Moreover, supercapacitors can store 10 to 100 times more energy per unit mass/volume than standard capacitors, but their energy densities are lower. To put it another way, developing supercapacitors with both high energy and power densities can help to take advantages of both battery packs and conventional capacitors. And this kind of supercapacitors can finally take the lead in EV's power supply.

In the field of supercapacitors, Lithium-ion capacitor (LIC) is a hybrid kind of capacitors which can provide advantages of both capacitor and battery. LIC has activated carbon as positive electrode (PE), while negative electrode (NE) materials are various, such as soft carbon, hard carbon, and graphite. This newly developed Li-ion hybrid capacitor can take advantages of both battery and capacitor, which indicates the possibilities of gaining high energy and power densities at the same time. To further realize the utilization in EV's or other large equipment, various capacitance designed LICs with high energy, power density, long life performance and wide temperature ranges are necessary to be developed.

In LIC, cell components and designs are important to optimize the electrochemical performance of LICs, which include PE active material and binders, NE active material and binders, thickness/mass ratio of PE to NE active layers (without current collectors including aluminum (Al) and copper (Cu)), capacity ratio of PE to NE active layers. PE and NE's size designs and layer numbers, types of material for separators, electrolyte compositions and NE pre-lithiation methods. For PE, as mentioned above, the active material is activated carbon (AC) and binders can be polytetrafluoroethylene (PTFE), polyvinylidene difluoride (PVDF), styrene butadiene rubber (SBR), carboxymethyl cellulose (CMC) etc. For NE, as mentioned above, the active material can be hard carbon (HC), soft carbon (SC), graphite (G) and other carbon-based material. The binders for NE include polyvinylidene difluoride (PVDF), styrene butadiene rubber (SBR), carboxymethyl cellulose (CMC) etc. The material of separators can be polypropylene (PP), Polyethylene (PE) and cellulose.

The organic electrolyte is a Li-ion battery electrolyte containing a Li salt, and it also carries the responsibility of transporting ions. To ensure the LIC can achieve the highest electrochemical performance, the pre-lithiation, which is called a Li pre-doping of NE, is the key process. The conventional pre-lithiation methods, including electrochemical (EC) and external short circuit (ESC) methods, are utilizing a piece of Li metal as the sacrificial third electrode to pre-dope the lithium into the graphite or HC electrodes. In the EC pre-lithiation method, the NE and the Li metal are separated with a separator in lithium salt based organic electrolyte and the pre-doping process is performed by an electronic charger controlling the charge current or voltage.

In the ESC pre-lithiation method, the NE and sacrificial Li metal third electrode are short circuited through the external electric wire connection. However, it takes about 20 days for the lithium to be totally disappeared/fully lithiated into the NEs LIC laminate cell with the conventional pre-lithiation method, which is a long time and increases the total processing cost. Also, in the conventional pre-lithiation method, both the PE and NE current collectors should be porous to make paths for the lithium-ion to travel from the Li metal electrode through the LIC laminate cell, which also increases the manufacturing cost of the electrodes.

The new generation method of NE pre-lithiation is loading various lithium sources including lithium strips and ultra-thin lithium films (abbreviated u-Li) having holes onto the surface of NE. Using Li sources on the surface of NE can facilitate the process of cell fabrication. Because Li metal can be coated directly on carbon electrodes and current collector doesn't need to be porous to let Li-ion intercalate into NEs. After cell impregnation with electrolyte, the Li sources on the surface of NE electrochemically react with carbon electrode active layer and intercalate into the NEs.

In this patent, the influence of cell components and designs to the electrochemical performance of LIC will be reported and discussed. First, the effect of the active material and binders for PE and NE on LIC performance will be analyzed and compared. Secondly, various PE and NE designs including different thickness/capacity ratios of PE:NE, electrode size and layer number in LICs will be evaluated. Thirdly, influence of separator material to LIC cell performance will be reported. Finally, two different Li sources (Li strips and u-Li having holes) for NE pre-lithiation will be evaluated and compared.

SUMMARY OF THE INVENTION

The principle advantage of the present invention is to, provide a lithium-ion capacitor (LIC) which has excellent characteristics in the life time including cycle life and DC life, while also, maintaining high energy density and power density.

Another advantage of this invention is to provide a LIC having a positive electrode, a negative electrode pre-loaded on surface with lithium sources including lithium strips and ultra-thin lithium films (u-Li) having holes, a separator and an organic solvent electrolytic solution with lithium salt as the electrolyte.

Another advantage of this invention is to provide a LIC cell wherein the positive electrode active material is preferred to be activated carbon, carbon black, activated carbon/carbon black mixed (AC/CB), and the negative electrode active material is preferred to be hard carbon, soft carbon, graphite and any possible mix of above material.

Another advantage of this invention is to provide a LIC cell wherein the positive electrode active material activated carbon (AC) has a surface area in a range from 1000 to 3000 m$^2$/g.

Another advantage of this invention is to provide a LIC cell wherein the positive electrode active material activated carbon (AC) has a particle size $D_{50} \leq 10$ μm, the negative electrode active material has a particle size $D_{50} \leq 10$ μm.

Another advantage of this invention is to provide a LIC cell wherein the binder for manufacturing the positive electrodes used in this LIC cell is preferred to be polytetrafluoroethylene (PTFE), styrene butadiene rubber (SBR) and carboxymethyl cellulose (CMC).

Another advantage of this invention is to provide a LIC cell wherein the positive electrode formulation can be adjusted in a range of mass ratio between AC and PTFE. The mass ratio between AC and PTFE is preferred to be from 88:12 to 98:2.

Another advantage of this invention is to provide a LIC cell wherein the positive electrode formulation can be adjusted in, a range of mass ratio between AC/CB and SBR/CMC. The mass ratio between SBR and CMC is preferred to be from 3:1 to 1:3. The mass ratio between AC and CB is preferred to be from 90:10 to 99:1. The ratio between the total mass of AC and CB to the total mass of SBR and CMC is preferred to be from 85:15 to 98:2.

Another advantage of this invention is to provide a LIC cell wherein the binder for manufacturing the negative electrodes used in this LIC cell is preferred to be styrene butadiene rubber (SBR) and carboxymethyl cellulose (CMC).

Another advantage of this invention is to provide a LIC cell wherein the negative electrode formulation can be adjusted in a range of mass ratio between negative electrode active material and SBR/CMC. The mass ratio between SBR and CMC is preferred to be from 3:1 to 1:3. The ratio between the mass of negative electrode active material to the total mass of SBR and CMC is preferred to be from 90:10 to 98:2.

Another advantage of this invention is to provide a LIC cell wherein the total thickness of the positive electrode, which includes the thickness of double-side conductive material pre-coated aluminum (Al) foil and the thickness of the double-side active material layers, is 40 μm to 450 μm.

Another advantage of this invention is to provide a LIC cell wherein the total thickness of the negative electrode, which includes the thickness of double-side conductive material pre-coated copper (Cu) foil and the thickness of the double-side active material layers, is 20 μm to 350 μm.

Another advantage of this invention is to provide a LIC cell wherein the thickness ratio of the total thickness of the positive electrode active layers to the total thickness of the negative electrode active layers is preferred to be from 1:2 to 3:1.

Another advantage of this invention is to provide a LIC cell wherein the capacity ratio of the positive electrode active layers to the negative electrode active layers is preferred to be from 1:12 to 1:2.

Another advantage of this invention is to provide a LIC cell wherein the material of the separator is cellulose, polypropylene (PP) and polyethylene (PE) based material.

Another advantage of this invention is to provide a LIC cell wherein the mass per unit area of the Li sources including lithium strips and ultra-thin lithium films having holes loaded onto one side surface of the negative electrode is preferred to be 0.1 mg/cm$^2$ to 3 mg/cm$^2$.

Another advantage of this invention is to provide a LIC cell wherein the thickness of the Li sources including Li strips and ultra-thin Li films (u-Li) having holes loaded onto one side surface of the negative electrode is preferred to be 2 to 50 μm.

Another advantage of this invention is to provide a LIC cell wherein the number range of said Li strips as Li source loaded on one side surface of negative electrode is from 2 to about 10.

Another advantage of this invention is to provide a LIC cell wherein the area of said ultra-thin Li films (u-Li) having holes as Li source pre-loaded on one side surface of negative electrode is about 25% to about 100% of the area of the negative electrode.

Another advantage of this invention is to provide a LIC cell wherein the area size percentage range of said holes in said ultra-thin Li films having holes as Li source pre-loaded on the surface of negative electrode is from 0.01% to about 75%.

Another advantage of this invention is to provide a LIC cell wherein the mass ratio percentage of the Li sources including Li strips and ultra-thin Li films having holes pre-loaded onto one side surface of the negative electrode to the one side negative electrode active layer is preferred to be 7% to 14%.

Another advantage of this invention is to provide a LIC cell wherein the LIC cell is a laminate cell.

Another advantage of this invention is to provide a LIC cell wherein the LIC cell is a prismatic cell.

Another advantage of this invention is to provide an ultra-thin (≤1 mm in thickness) DC having two ultra-thin (≤50 μm in thickness) single-side positive electrodes, one ultra-thin (≤50 μm in thickness) double-side negative electrode pre-loaded on surface with ultra-thin lithium films (u-Li) having holes, a separator and an organic solvent electrolytic solution with lithium salt as the electrolyte.

Extensive research efforts by the inventors of the present invention resulted in successfully presenting the following unexpected solution to the problem of creating a lithium-ion capacitor (LIC) cell which is excellent in the cycling ability and DC life, having high energy density and power density. In the preferred embodiment of the invention the LIC cell system, the negative electrode is pre-doped with lithium ions by applying lithium sources including Li strips and ultra-thin Li films having holes onto the surface of the negative electrodes.

There are many factors which will influence the electro-chemical performance and capacity of the LIC cells when pre-doped in this manner. These factors include: (1) the materials used for the positive and negative electrodes including the active materials and binders; (2) the method of manufacturing the positive and negative electrodes; (3) the thickness of the positive and negative electrodes; (4) the thickness ratio of the total thickness of the positive electrode active layers to the total thickness of the negative electrode active layers; (5) the capacity ratio of the positive electrode active layers to the negative electrode active layers; (6) the material of the separator for the LIC cell; (7) the mass per unit area of the Li sources including Li strips and ultra-thin Li films having holes pre-loaded on surface of negative electrode; (8) the thickness of the Li sources including the Li strips and ultra-thin Li films having holes loaded on surface of negative electrodes; (9) the number range of Li strips pre-loaded on the surface of negative electrodes; (10) the area design of the ultra-thin Li films having holes pre-loaded on surface of negative electrodes and the hole area design on the ultra-thin Li films having holes; (11) the mass ratio percentage of the Li sources including Li Strips and ultra-thin Li films having holes pre-loaded onto one side surface of the negative electrode to the one side negative electrode active layer.

The present invention may be summarized as follows: according to the LIC of present invention, there is provided a LIC cell including a positive electrode, a negative electrode pre-loaded on surface with lithium sources including lithium strips and ultra-thin lithium films having holes, a separator and an organic solvent electrolytic solution with lithium salt as the electrolyte.

In the LIC cell of the present invention, it is preferable that the positive electrode active material is activated carbon, carbon black, or activated carbon/carbon black mixed (AC/CB). In the LIC cell of the present invention, the negative electrode active material is preferred to be graphite, hard carbon and soft carbon or any possible mix of above material.

In the LIC cell of the present invention, is preferable that the positive electrode active material activated carbon (AC) has a surface area in a range from 1000 to 3000 $m^2/g$.

In the LIC cell of the present invention, it is preferable that the positive electrode active material activated carbon (AC) has a particle size D50≤μm, the negative electrode active material has a particle size D50≤μm.

In the LIC cell of the present invention, the binder for manufacturing the positive electrodes is polytetrafluoroethylene (PTFE), styrene butadiene rubber (SBR) and carboxymethyl cellulose (CMC).

In the LIC cell of the present invention, the positive electrode formulation can be adjusted in a range of mass ratio between AC and PTFE. It is preferable that the mass ratio between AC and PTFE is from 88:12 to 98:2.

In the LIC cell of the present invention, the positive electrode formulation can be adjusted in a range of mass ratio between AC/CB and SBR/CMC. It is preferable that the mass ratio between SBR and CMC is from 3:1 to 1:3. It is preferable that the mass ratio between AC and CB is from 90:10 to 99:1. It is preferable that the ratio between the total mass of AC and CB to the total mass of SBR and CMC is from 85:15 to 98:2.

In the LIC cell of the present invention, the binder for manufacturing the negative electrodes is styrene butadiene rubber (SBR) and carboxymethyl cellulose (CMC).

In the LIC cell of the present invention, the negative electrode formulation can be adjusted in a range of mass ratio between negative electrode active material and SBR/CMC. It is preferable that the mass ratio between SBR and CMC is from 3:1 to 1:3. It is preferable that the ratio between the mass of negative electrode active material to the total mass of SBR and CMC is from 90:10 to 98:2.

In the LIC cell of the present invention, the total thickness of the positive electrode, which includes the thickness of double-side conductive material pre-coated aluminum foil and the thickness of the double-side active material layers, is 40 μm to 450 μm. In the LIC cell of the present invention, the total thickness of the negative electrode, which includes the thickness of double-side conductive material pre-coated copper foil and the thickness of the double-side active material layers, is 20 μm to 350 μm. In the LIC cell of the present invention, the thickness ratio of the total thickness of the positive electrode active layer to the total thickness of the negative electrode active layers is preferred to be from 1:2 to 3:1.

In the LIC cell of the present invention, the capacity ratio of the positive electrode active layers to the negative electrode active layers is preferred to be from 1:12 to 1:2.

In the LIC cell of present invention, it is preferable that the material of the separator is cellulose, polypropylene (PP) and polyethylene (PE) based material in the LIC cell.

In the LIC cell of the present invention, the mass per unit area of the Li sources including Li strips and ultra-thin Li films having holes loaded onto one side surface of the negative electrode is preferred to be 0.1 $mg/cm^2$ to 3 $mg/cm^2$.

In the LIC cell of the present invention, the thickness of the Li sources including Li strips and ultra-thin Li films having holes pre-loaded onto one side surface of the negative electrode is preferred to be 2 to 50 μm.

In the LIC cell of the present invention, the number range of said Li strips as Li source pre-loaded on surface of negative electrode is preferred to be 2 to about 10.

In the LIC cell of the present invention, the area of said ultra-thin Li films having holes as Li source pre-loaded on surface of negative electrode is preferred to be about 25% to about 100% of the area of the negative electrode.

In the LIC cell of the present invention, the area size percentage range of said holes in said ultra-thin Li films having holes as Li source pre-loaded on surface of negative electrode is preferred to be from about 0.01% to about 75%.

In the LIC cell of the present invention, the mass ratio percentage of the Li sources including Li strips and ultra-thin Li films having holes pre-loaded onto both side surfaces of the negative electrode to the both side negative electrode active layers are preferred to be 7% to 14%.

According to the LIC of present invention, there is provided an ultra-thin (≤1 mm in thickness) LIC cell including two ultra-thin (≤50 μm in thickness) single-side positive electrodes, one ultra-thin (≤50 μm in thickness) double-side negative electrode pre-loaded on surface with ultra-thin lithium films (u-Li) having holes, a separator and an organic solvent electrolytic solution with lithium salt as the electrolyte.

According to the present invention, there is provided a LIC cell having high energy density, high power density and long-life performance.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE DRAWINGS

The accompanying drawings, which are incorporated in and form a part of this specification, illustrate embodiments of the invention and together with the description, serve to explain the principles of this invention.

FIG. 19 represents TABLE 2 which illustrates the characteristics of example cells A1 through C1 (see below examples) with regard to positive electrode active material and binder, negative electrode active material, positive and negative electrode size, PE and NE active layer thickness ratio, number of electrode sheets, separator type, type of Li sources including Li strips and ultra-thin Li film having holes, number of Li sources pre-loaded on NE, Li source size, Li loading mass per unit area and mass ratio of Li source to NE active layer data.

FIG. 20 represents TABLE 3 which illustrates the characteristics of cells A1 through C1 with regard to total final cell weight, LIC size, capacitance, DC-ESR, specific energy, energy density, maximum specific power, maximum power density, cycle life capacitance retention (%) and DC-ESR retention (%) after 100,000 cycles, DC life capacitance retention (%) and DC-ESR retention (%) after 2000 hours testing under 3.8 V at 65° C.

DETAILED DESCRIPTION OF PREFERRED EMBODIMENTS

Figure 1:
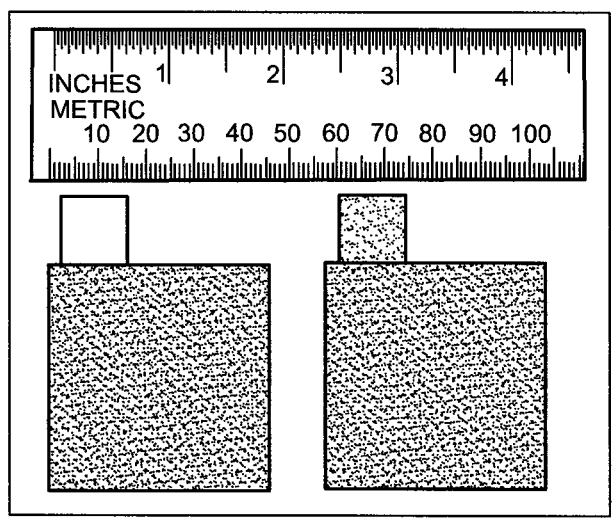
FIG. 1 depicts a picture of the punched positive and negative electrodes with 15 mm×15 mm (width×length) tabs.

For a fuller understanding of the nature and objects of the invention, reference should be had to the following detailed description taken in conjunction with the accompanying drawings wherein similar parts of the invention are identified by like reference numerals. The figures are not drawn to scale and they are provided merely to illustrate the instant invention. Several aspects of the invention are described below with reference to example applications for illustration.

It should be understood that numerous specific details, relationships, and methods are set forth to provide a full understanding of the invention. One having ordinary skill in the relevant art, however, will recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The LIC cell of the present invention includes positive electrodes, negative electrodes with lithium sources including Li strips and ultra-thin Li films having holes applied on surface, separators and an organic electrolyte solution with lithium salt that are housed in a container, for example a metal can container or a laminated outer container.

The LIC cell of the present invention generally has a cell core unit formed by stacking positive electrodes and negative electrodes through separators in an outer container, for example a laminated outer container. The negative electrodes are pre-doped by pressing the lithium sources including Li strips and ultra-thin Li films having holes on the surface of the negative electrodes. The "pre-dope" roughly represents a phenomenon in which the lithium ions enter into the negative electrode active layer. The Li strips or ultra-thin Li films having holes are the lithium ion supply sources to pre-dope the negative electrodes. The lithium source loading process can make sure that the negative electrodes contain uniform lithium on the surface so that when the electrolyte is filled, the negative electrodes can be smoothly and uniformly pre-doped with lithium ions.

In the LIC cell according to the present invention, the cell core unit is configured as described below. The Cu and Al substrates are welded to nickel (Ni) coated copper (Cu) and aluminum (Al) current collector tabs, respectively. After the stacking and wielding processes, the electrode units are housed in a container, for example an aluminum laminated formed case that is suitable for the size of the electrode units and three-side heat sealing process will be applied. Then the desired amount of electrolyte was filled into the LIC laminate cell to soak the cell to initiate the pre-doping process by intercalation of the lithium into the negative electrodes. After the cell has been soaked for enough time, then the vacuum sealing process will be applied to the cell in order to remove the excess gas trapped in the LIC laminate cell. As a result, such a constitution can be achieved for the LIC laminated cell.

Each component constituting the LIC cell according to the present invention will next be described.

Active Material for the Positive and Negative Electrodes

As the positive electrode active material, it should be capable of being reversibly adsorb or desorb with lithium ion and anions in the electrolyte such as tetrafluoroborate. One of the examples for such material is the activated carbon powders. The specific surface area of the activated carbon is 1,500 $m^2/g$ to 2,800 $m^2/g$, preferably 1,600 $m^2/g$ to 2,400 $m^2/g$. It is preferred that the diameter of 50% accumulated volume (D50) (average particle diameter) of the activated carbon should be 2 μm to 10 μm. It is particularly more preferred front 3 μm to 8 μm so that the energy density and power density of the LIC laminate cell can be further improved. Some other examples for such material can be carbon black and activated carbon/carbon black composite material (AC/CB).

As the negative electrode active material, it should be capable of being reversibly intercalated and de-intercalated with lithium ions Examples for such material are the graphite-based composite particles, non-graphitizable carbon (hard carbon, (HC)) and graphitizable carbon (soft carbon, (SC)). In the present invention, as the negative electrode active material, the HC and SC particles are preferred because they can achieve higher performance in power performance and the cycling stability than graphite material. However, the graphite material can achieve higher energy performance for the LIC cause the graphite has a higher specific capacity than BC and SC. In order to, improve the power performance of the LIC cell, it is preferable that BC and SC having, particle size that satisfies a diameter of 50% accumulated volume (D50) within a range of 1.0 to 10 μm; more preferably within a range of 2 to 6 μm are used as the negative electrode active material.

It should be noted that it is difficult to produce the BC and SC particles having a diameter of 50% accumulated volume (D50) of less than 10 μm. When the HC and SC particles have a diameter of 50% accumulated volume (D50) of more than 10 μm, a LIC cell which has a sufficiently small internal resistance is difficult to be achieved. It is preferred that the negative electrode active material has a specific surface area of 0.1. to 200 $m^2/g$, and 0.6 to 60 $m^2/g$ is more preferred. The reasons for setting such a range are that the resistance of the LIC cell can be high if the specific surface area of the negative electrode active material is less than 0.1 $m^2/g$ and the irreversible capacity of the LIC laminate cell during charging can he high if the specific surface area of the negative electrode active material is more than 200 $m^2/g$.

Method of Manufacturing the Positive and Negative Electrodes

In the LIC cell of present invention, it is preferred that the positive electrode used is an electrode including a sheet-shaped metal current collector with double-side coated conductive material and electrode layers composed of the positive electrode active material and the binders, and formed on both surfaces of the current collector. The negative electrode, used in this LIC laminate cell of present invention is an electrode including a sheet-shaped metal current collector with double-side coated conductive material and electrode layers composed of the negative electrode active material and the binders, and formed on both surfaces of the current collector.

The current collector used in the positive electrode can be made up by aluminum, stainless steel etc. Aluminum is preferred. The current collector used in the negative electrode can be made up by stainless steel, copper, nickel etc. Copper is preferred. It is preferred that the thicknesses of the current collectors in positive and negative electrodes are 5 to 50 μm, 8 to 25 μm is preferred. This range enables that the positive and negative electrodes obtained have high strength and it is easy for the conductive coating material slurry to be applied. The conductive material coating accuracy, and the volumetric energy density and gravimetric energy density can be improved. Both surfaces of the positive and negative current collectors were coated with carbon conductive coating slurry by a spraying/coating method and dried thereby to obtain the current collectors that have a conductive layer for both positive and negative electrodes. The carbon conductive coating thickness on one side of the current collector is 1 to 20 μm, 3 to 12 μm is preferred.

The positive and negative electrodes in this invention are made of the electrode active material mentioned above. Specifically, a positive/negative electrode active material powder, a binder and some solvent are dispersed into the blender to be mixed to obtain a dry powder or wet slurry mixture. The percentage of the binder added in the powder/slurry mixture is preferred to be 2% to 12%. For positive electrode fabrication, the binder used in the dry powder mixture based free-standing films is preferred to be polytetrafluoroethylene (PTFE). Then the dry powder mixture is pressed through the high temperature mill rollers to obtain the free-standing films which are the positive electrode active material layers. The thickness of the positive free-standing film is 30 to 250 μm, 50 to 200 μm is preferred. Then the free-standing films are laminated onto the both sides of the carbon conductive pre-coated current collector by high temperature hot mill rollers (laminator) to form the final positive electrodes for the LIC cells. The binder used in the wet slurry mixture based positive electrode is preferred to be SBR, CMC or SBR/CMC mixed. The positive electrode active material, the SBR/CMC binder and de-ion water as solvent are mixed for enough time in the mixer first to form uniform wet slurry. Then the slurry is coated onto the both sides of the carbon conductive pre-coated current collector by electrode coating machine with drying oven attached so that the coated electrodes can be dried. The gap of the coating machine will be adjusted according to the initial thickness requirement of electrode fabrication. Then the dried electrodes are pressed down into desire active layer thickness through a hot press calendar to form the final positive electrodes for the LIC cells. The thickness of positive electrode active layer based on wet shiny fabrication method on one side of the current collector is 3 to 250 μm 5 to 200 μm is preferred.

For negative electrode fabrication, the dry powder mixture based binder PTFE is not applied because PTFE reacts dramatically with Li sources which damages the electrode structure. The binder used in the wet slurry mixture based negative electrode is preferred to be SBR, CMC or SBR/CMC mixed. The negative electrode active material, the SBR/CMC binder and de-ion water as solvent are mixed for enough time in the mixer first to form uniform wet slurry. Then the slurry is coated onto the both sides of the carbon conductive pre-coated current collector by electrode coating machine with drying oven attached so that the coated electrodes can be dried. The gap of the coating machine will be adjusted according to the initial thickness requirement of electrode fabrication. Then the dried electrodes are pressed down into desire active layer thickness through a hot press calendar to form the final negative electrodes for the LIC cells. The thickness of negative electrode active layer based on wet slurry fabrication method on one side of the current collector is 3 to 200 μm, 5 to 160 μm is preferred.

In the LIC cell of the present invention, the total thickness of the positive electrode, which includes the thickness of double-side conductive material pre coated current collector and the thickness of the double-side active layers, is preferred to be 40 μm to 450 μm. In the LIC cell of the present invention, the total thickness of the negative electrode, which includes the thickness of double-side conductive material pre-coated current collector and the thickness of the double-side active material layers, is preferred to be 20 μm to 350 μm. In the LIC cell of the present invention, the thickness ratio of the total thickness of the positive electrode active layers to the total thickness of the negative electrode active layers is preferred to be from 1:2 to 3:1.

Methods of Pre-loading the Li Sources onto the Negative Electrodes

Method 1 : Lithium Strips Pre-loaded on Surface of Negative Electrodes

During the assembling process of the LIC cell of the present invention, after all the negative electrodes are dried in a vacuum oven at 120° C. for overnight, the Li strips are applied onto the surface of all the prefabricated negative electrodes by manufacturing method of laminating the negative electrodes with top and bottom Li strips which is described in detail in our former patent application U.S. Ser. No. 15/457,097 in a dry room which has a Dew Point lower than −45° C. The pressure of lamination rolls should be 40 kg/cm$^2$ to 400 kg/cm$^2$. In the LIC cell of the present invention, the mass per unit area of the Li strips loaded onto one side surface of the negative electrode is preferred to be 0.1 mg/cm$^2$ to 3 mg/cm$^2$. The thickness of Li strips pre-loaded on one side surface of negative electrode is preferred to be 2 to 50 μm. The length of said Li strips as Li source loaded on surface of negative electrode is preferred to be 3 mm to 250 mm and the width of said Li strips as Li source loaded on surface of negative electrode is preferred to be 3 mm to 75 mm. The number range of said Li strips as Li source loaded on surface of negative electrode is preferred to he 2 to about 10. The mass ratio percentage of the Li strips pre-loaded onto one side surface of the negative electrode to the one side negative electrode active layer is preferred to be 7% to 14%. After all the Li strips are pressed onto the negative electrode, there should be a uniform thin layer Li source location distribution on the surface of the negative electrode.

Method 2: Ultra-Thin Lithium Films Having Holes Pre-Loaded on Surface of Negative Electrodes Another Li source pre-loaded on surface of negative electrodes is ultra-thin Li films having holes. The ultra-thin Li films having holes are applied onto the surface of all the prefabricated negative electrodes by manufacturing method of laminating the negative electrodes with top and bottom ultra-thin Li films having holes which is described in detail in our former patent application U.S. Ser. No. 15/489,813 in a dry room which has a Dew Point lower than −45° C. The pressure of lamination rolls should be 40 kg/cm$^2$ to 400 kg/cm$^2$. In the LIC cell of the present invention, the mass per unit area of the ultra-thin Li films having holes loaded onto one side surface of the negative electrode is preferred to be 0.1 mg/cm$^2$ to 3 mg/cm$^2$. The thickness of ultra-thin Li films having holes pre-loaded on one side surface of negative electrode is preferred to be 2 to 50 μm. The length of said ultra-thin Li films having holes as Li source loaded on surface of negative electrode is preferred to be 30 mm to 250 mm and the width of said ultra-thin Li films having holes as Li source loaded on surface of negative electrode is preferred to be 30 mm to 150 mm. The area of said ultra-thin Li films having holes as Li source loaded on surface of negative electrode is preferred to be about 25% to about 100% of the area of the negative electrode. The area size percentage range of said holes in said ultra-thin Li films having holes as Li source loaded on surface of negative electrode is preferred to be from about 0.01% to about 75%. The mass ratio percentage of the ultra-thin Li films having holes pre-loaded onto both side surfaces of the negative electrode to the both side negative electrode active layers is preferred to be 7% to 14%. After all the ultra-thin Li films having holes are pressed onto the negative electrode, there should be a uniform thin layer Li source location distribution on the surface of the negative electrode.

Punched Electrode Size Before Stacking into Cell Unit

In the LIC cell of present invention, all the electrodes including the positive electrodes and negative electrodes with lithium sources pre-loaded on surface should be punched into designated size with some additional current collector tabs before stacking into a cell core unit. The size of the electrodes decides the final size of the LIC cell because the outside container should match the size of the electrodes. It is preferred that the length and width of the negative electrode is 0.5 mm to 5 mm larger than that of positive electrode for the LIC cell. In the LIC cell of the present invention, it is preferred that the length of the punched positive and negative electrodes is 30 mm to 250 mm and the width of the punched positive and negative electrodes is 30 mm to 150 mm.

LIC Cell Core Unit & Cell Fabrication

In the LIC cell according to the present invention, the LIC cell core unit is configured as described: the Cu and Al substrates are welded to nickel (Ni) and aluminum (Al) current collector tabs, respectively; This cell core unit is configured by stacking a positive electrode having a positive electrode active material layer formed on a positive electrode current collector, a first separator, a lithium source including Li strips and ultra-thin Li films having holes pre-loaded negative electrode having a negative electrode active material layer formed on a negative electrode current collector, and a second separator in this order. It is preferred that both top and bottom of the stacking cell core unit are single-side coated positive electrodes so that the number of the positive electrode sheets is always 1 more than that of the negative electrode sheets in the LIC cell; It is also preferred that the number of the positive electrode sheets in the LIC cell of the present invention is 2 to 30 and the number of the negative electrode sheets in the LIC cell of the present invention is 1 to 29. The separators with cellulose, polypropylene (PP) and polyethylene (PE) based material are preferred to be used in the LIC cell of present invention.

After the stacking and welding processes, the cell core unit is housed in a container, for example an Al laminated formed case that is suitable for the size of the cell core unit and three-side heat sealing process will be applied. Then the desired amount of electrolyte is tilled into the container to soak the cell to initiate the pre-lithiation process by intercalation of lithium ions from Li sources including Li strips and ultra-thin Li films having holes into the negative electrodes. After the cell being soaking for enough time, vacuum sealing process will be applied to the cell to remove the excess gas trapped in the LIC. As a result, such a constitution can be achieved for the LIC.

EXAMPLES

The present invention will he described in more details by the following examples. It should be understood that the present invention is not limited to the examples to be described hereunder.

Example 1-A1

Experimental

Commercial active materials were used for both the positive and negative electrodes as received. The positive electrode (PE) was prepared by coating a slurry mixture of activated carbon (AC) and polytetrafluoroethylene (PTFE) as a binder by the mass ratio of 92:8 on an Al foil substrate (Exopack™, 20 μm in thickness). The AC material is CEP21KS (Power Carbon Technology Co., Ltd., Korea) which has a surface area of about 2000 $m^2$/g and a particle size (D50) of 8 μm. The slurry mixture of the negative electrode (NE) was made of hard carbon which has a particle size (D50) of 2 μm and SBR/CMC as a binder by the mass ratio of 96:3:1. After the slurry was prepared, it was coated onto a Cu foil substrate that had a thickness of 10 μm. Then the electrodes were dried at 160° C. for 3 h in oven with flowing air.

After all the electrodes were dried, a hot-roll pressing was applied to the AC and HC electrode sheets to make them into the desired thickness (total thickness including the double-side carbon conductive coated Al/Cu and the double-side electrode active material layers), 236 μm for double-side coated PE, 128 μm for top and bottom single-side coated PE and 200 μm for NE. The thickness ratio of the total thickness of the PE active layer to the total thickness of NE active layer is about 1.1:1, The capacity ratio of PE:NE active layers is about 1:7. All the electrode sheets were kept in the dry room and punched out into electrodes with desired electrode size. The size for the positive electrode is 45×45 mm with 15 mm width and 15 mm length tab as shown in FIG. 1; the size for the negative electrode is 46×46 mm with 15 mm width and 15 mm length tab as shown in FIG. 1.

Figure 2:
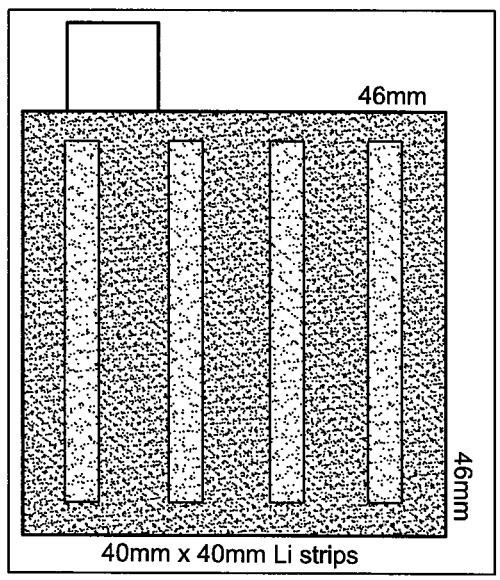
FIG. 2 depicts a schematic representation of the 46×46 mm hard carbon negative electrode with four 40×4 mm Li stripes pre-loaded on the surface.
Figure 3:
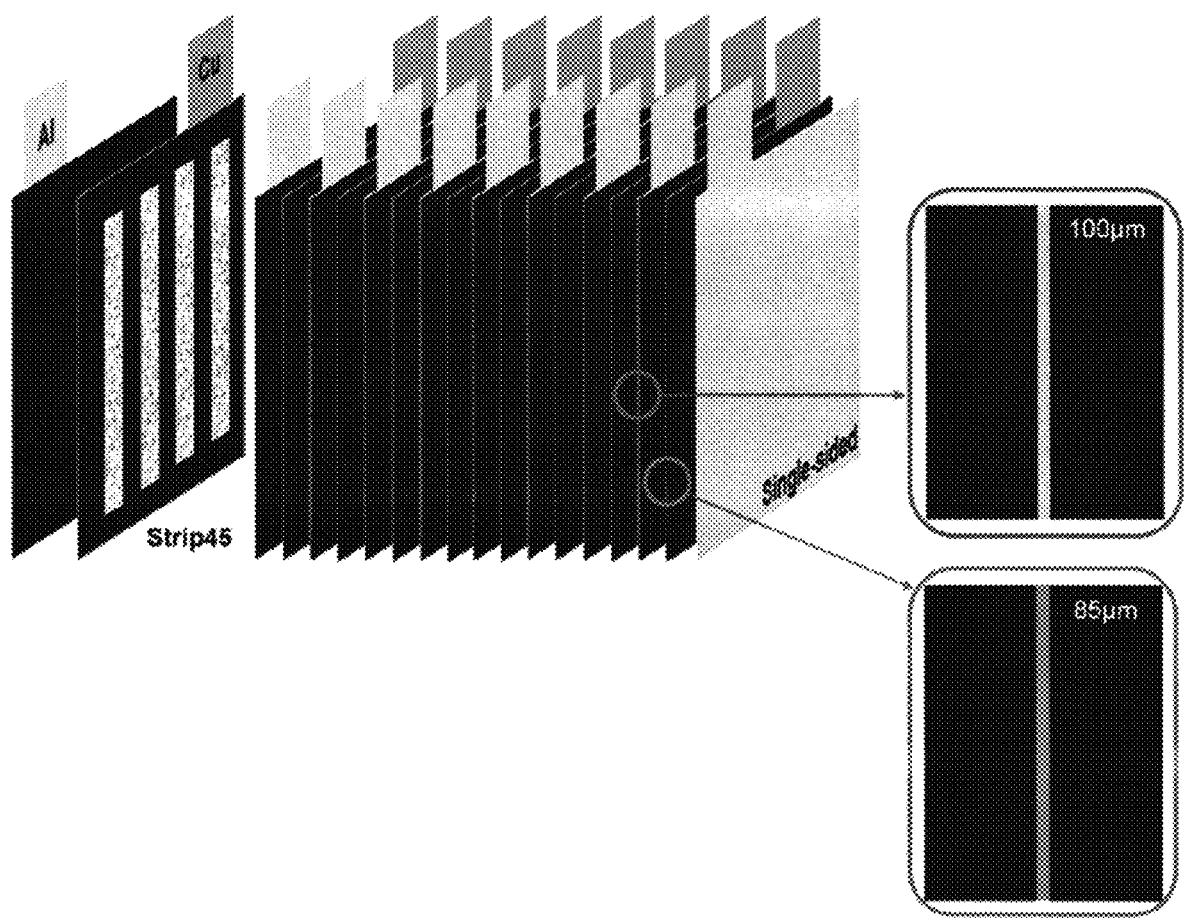
FIG. 3 depicts a schematic representation of the stacking core for the LIC cell A1 (separators between PEs and NEs are ellipsised).

All the electrodes were dried again at 160° C. for overnight in a vacuum oven and then the Li strips as the Li source were applied onto the surface of all the pre-fabricated HC negative electrodes by laminating the NE with top and bottom Li strips and then roll-pressing in a dry room before being assembled into the pouch cell as shown in FIG. 2. It can be seen from FIG. 2 that the size of each Li strip is 40 mm (length)×4 mm (width)×45 μm (Thickness) and the number of Li strips loaded on one side surface of NE is 4. The mass per unit area of the Li strips loaded onto one side surface of the NE is 0.8 mg/$cm^2$. The mass ratio percentage of Li strips loaded onto one side surface of the NE to the one side NE active layer is about 9%. After the Li strips loadings on NE, all the punched electrodes were stacked to form a cell core unit as shown in FIG. 3.

The number of the PE sheets in LIC cell A1 is 10 including top and bottom single-side coated PEs and the number of the NE sheets in A1 is 9, respectively. It can be seen from FIG. 3 that the separators are ellipsised. After the stacking and welding processes, the cell core was housed in an aluminum laminated formed case that is suitable for the size of the electrodes. Then the vacuum heat sealing process was applied to the case with the cell core in order to remove the excess gas trapped in the cell after the pouch cells were filled with electrolyte and soaked for enough time to allow the pre-lithiation process to be complete.

The separator used was polypropylene (PP) based material. The electrolyte was 1 M LiPF$_6$ in ethylene carbonate (EC): dimethyl carbonate (DMC) at a ratio of 1:1 by weight. After filling electrolyte and the vacuum sealing process, the LIC cell A1 was allowed to further stand for 24 hours to let the process of Li strips intercalating process complete. The LIC cell A1 was then in the formation process before evaluation. After the formation cycle, the LIC cell A1. was de-gassed and resealed under vacuum. The capacitance (C) and DC-ESR were obtained by charging-discharging the LIC cell A1 under a constant current of 80 mA as 1 C rate and 4 A as 50 C rate both for 3 cycles with 15 s rest time between each charge and discharge steps. After the initial C&ESR testing, the electrochemical impedance spectrum (EIS) of the cell A1 was recorded by Gantry instruments Reference 3000 Potentiostat/Gialvanostat/ZRA. The frequency range is from 0.01 to 10$^6$ Hz and the amplitude is 10 mV. 2000 hours DC life was conducted to the LIC cell by holding the cell at maximum operating voltage 3.8 V in a 65° C. oven. The LIC cell A1 was finally charged and discharged under a constant current of 4 A, 7 A and 10 A for 100,000 cycles to obtain the cycling performance under various charge-discharge rates. The electrochemical performance of LIC cell A1 was tested by an Arbin BT-2000 Battery Testing Unit and the LIC cell A1 is clamped with acrylic plates under a constant pressure of 10 kg all the time during all the tests. To investigate the surface morphology of both PE and NE, a field emission scanning electron microscope (SEM) (JEM-ARM200cF) were used. Electrodes sample were prepared and scanned under 10 KV condition.

Results and Discussion

Figures 4A, 4B:
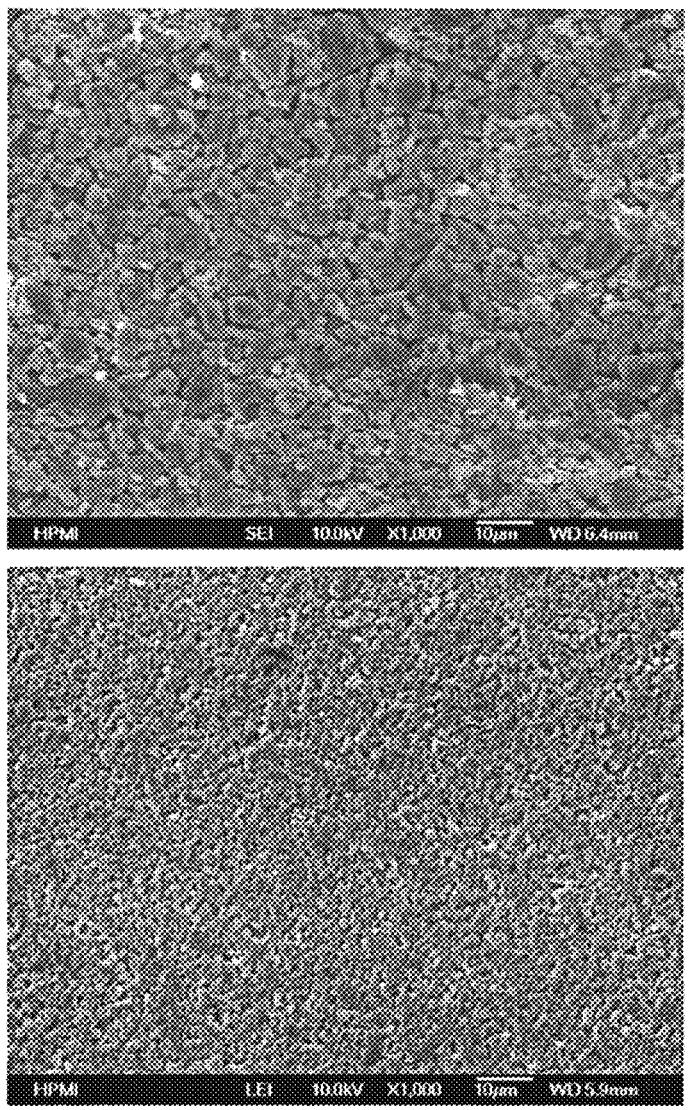
FIG. 4A shows a scanning electron micrograph (SEM) images of an activated carbon positive electrode.
FIG. 4B shows a scanning electron micrograph (SEM) images of a hard carbon#1 negative electrode.

The SEM images of the PE and NE are shown in FIGS. 4A and 4B. It can be observed that the AC PE shows an average particle size of 5~8 μm and a porous structure. The PE's porosity is about 70%. For the HC NE, it is observed that HC shows an irregular shape with sharp edge and an average small particle size of 2 μm, which indicates that this HC enables fast Li diffusion process during Li intercalation reactions. Therefore, LIC with this type of HC NE can achieve excellent rate performance. NE's porosity is about 50%.

Figure 5A:
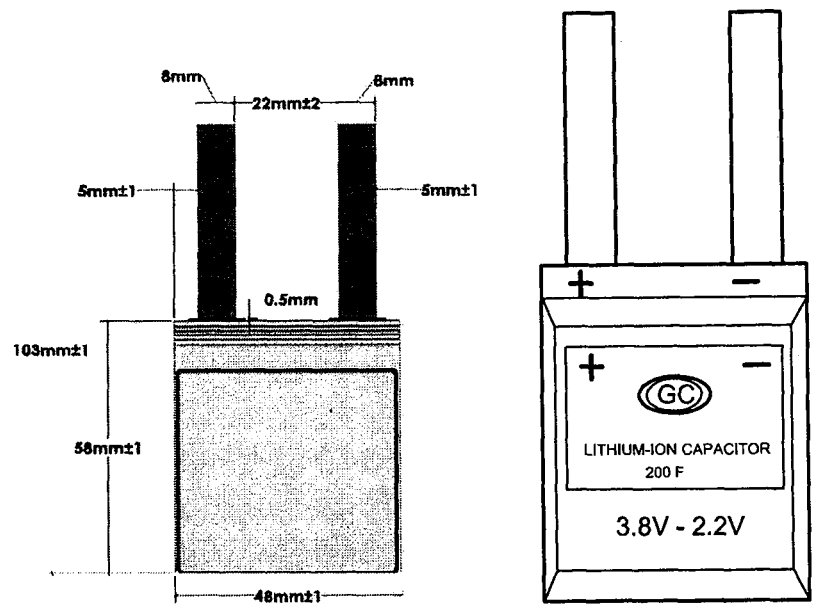
FIG. 5A depicts as sketch of LIC cell A1 and dimension and picture of the LIC cell A1.
Figure 5B:
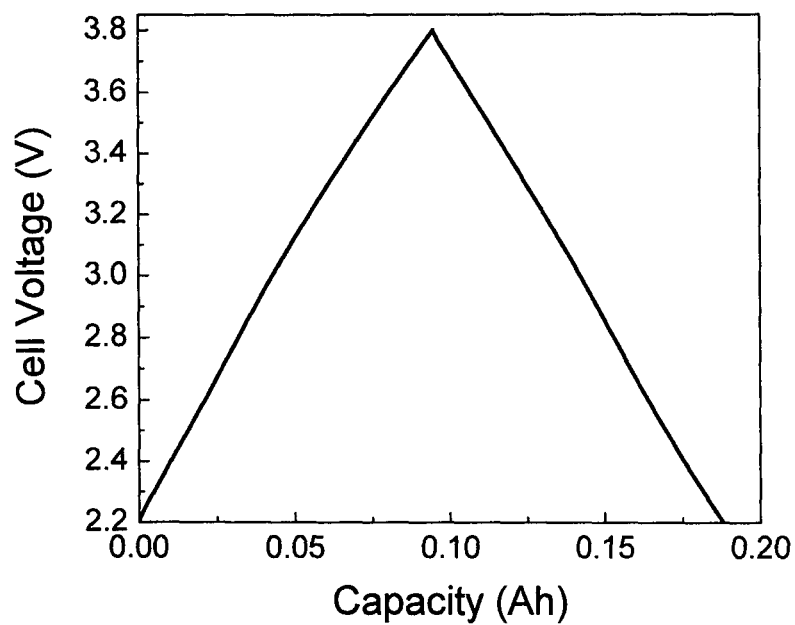
FIG. 5B shows an Initial C&ESR testing charge-discharge voltage profiles of A1 at a constant current of 80 mA from 3.8 to 2.2. V and (c) the EIS of the LIC cell A1.

The sketch, dimension and picture of the LIC cell A1 are displayed in FIG. 5A and the cell voltage profiles for one full cycle in the voltage range of 3.8-2.2 V under a constant current of 80 mA is shown in FIG. 5B. Maxwell electrochemical capacitor calculation method (see http://www-.maxwell.com/images/documents/K2Series_DS_1015370_5_20141104.pdf) is used to obtain the capacitance and DC-ESR of LIC cell A1. The specific energy and energy density are calculated based on cell's maximum and minimum voltage of 3,8 and 2.2 V and based on the following formulas (1) and (2); the maximum specific power and maximum power density are calculated based on cell's maximum operating voltage 3.8 V only and based on formulas (3) and (4) because it is maximum power that is calculated, not the average specific power or average power density:

$$\text{Specific Energy: } E_S = \frac{\frac{1}{2}C(V_{max}^2 - V_{min}^2)}{\text{mass}} \quad (1)$$

$$\text{Energy Density: } E_D = \frac{\frac{1}{2}C(V_{max}^2 - V_{min}^2)}{\text{volume}} \quad (2)$$

$$\text{Maximum Specific Power: } P_{max\ S} = \frac{V_{max}^2}{4 \times ESR_{DC} \times \text{mass}} \quad (3)$$

$$\text{Maximum Power Density: } P_{max\ D} = \frac{V_{max}^2}{4 \times ESR_{DC} \times \text{volume}} \quad (4)$$

where $V_{max}$ and $V_{min}$ are cell's maximum and minimum voltages, respectively; C is the capacitance of the cell; $ESR_{DC}$ is the DC-ESR of the cell; mass is the total mass of the cell and volume is the total volume of the cell.

Figure 5C:
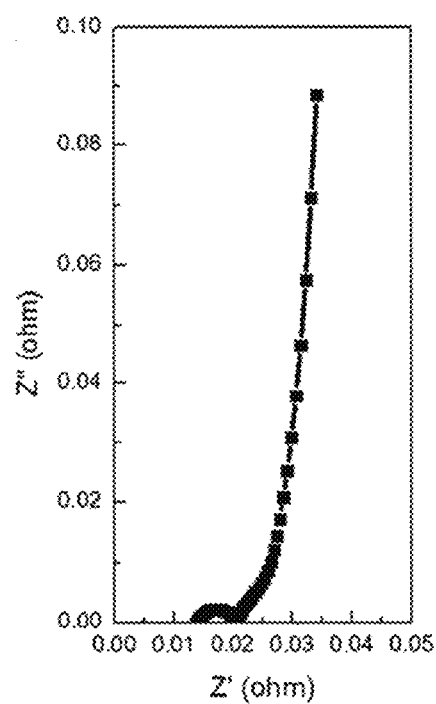
FIG. 5C shows the EIS of the LIC cell A1.

The electrochemical impedance spectra (EIS) W as performed to the LIC cell A1 as shown in FIG. 5C to obtain the AC-ESR value. All the, cell parameters of LIC cell A1 are summarized in Table 1. It can be seen from Table 1 that cell A1 has a specific energy of 14 Wh/kg and an energy density of 25 Wh/L, which is about three times of the conventional EDLCs. The maximum specific power and maximum power density are as high as 7 kW/kg and 12 kW/L. When the maximum power was calculated by formulas (3) and (4), only the peak power was calculated when the LIC had matched-load and the operating voltage was at maximum voltage 3.8 V of the LIC; However, when the average power was calculated, the specified minimum operating voltage 2.2 V should be considered and there should be other formulas that need to be developed and formulas (3) and (4) could not be used.

TABLE 1

Summary of cell parameters for the LIC laminate cell

Summary of LIC Cell A1 Parameters

| No. | LIC name | A1 |
|---|---|---|
| 1 | LIC Cell Capacitance (1 C Rate) (F) | 220 |
| 2 | LIC Cell Weight (g) | 21 |
| 3 | Cell Size (Not Include Tabs) (mm) (Length × Width × Thickness) | 50 × 48 × 4.9 |
| 4 | Tab Size (mm) (Width × Thickness) | 8 × 0.09 |
| 5 | Distance between Tabs (mm) | 20 |
| 6 | AC-ESR (mΩ) | 14 |
| 7 | DC-ESR (50 C Rate) (mΩ) | 25 |
| 8 | Specific Energy, $E_S$ (Wh/kg) | 14 |
| 9 | Energy Density, $E_D$ (Wh/L) | 25 |
| 10 | Max. Specific Power, $P_{maxS}$ (kW/kg) | 7 |
| 11 | Max. Power Density, $P_{maxD}$ (kW/L) | 12 |

Figure 6A:
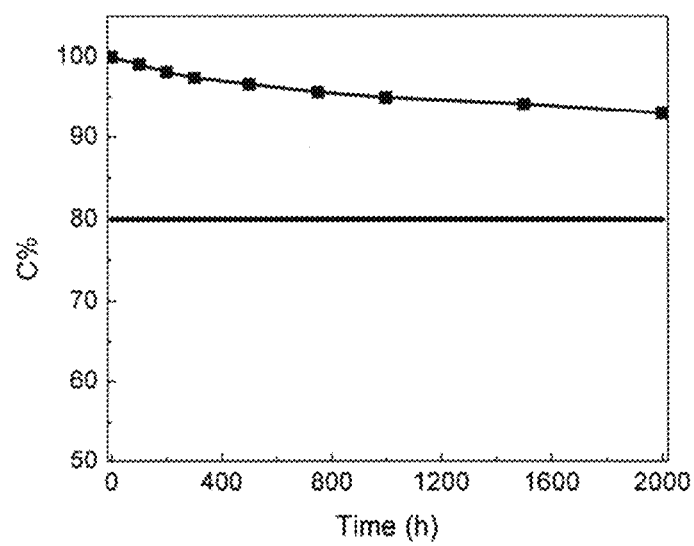
FIG. 6A depicts the DC life performance of the LIC cell A1 held at maximum voltage 3.8 V under 65° C. with regard to Capacitance; and (b) ESR percentage changes as a function of time.
Figure 6B:
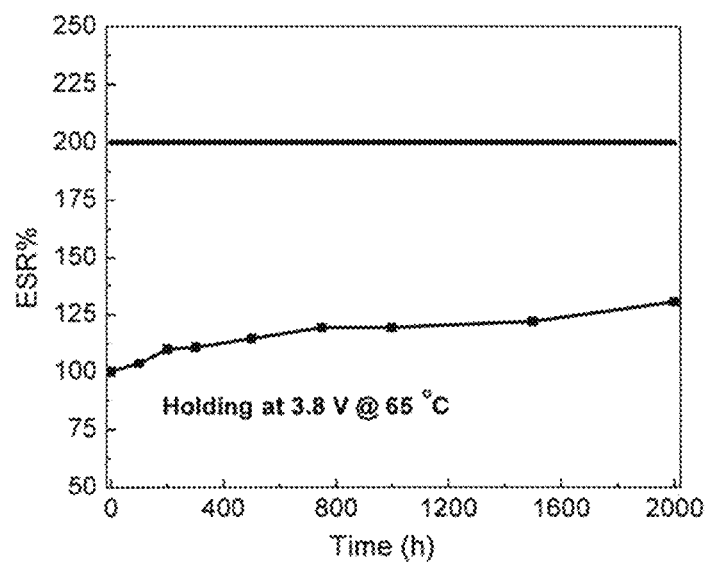
FIG. 6B depicts the DC life performance of the LIC cell A1 held at maximum voltage 3.8 V under 65° C. with regard to ESR percentage changes as a function of time.

To investigate the electrochemical stability of the LIC cell A1 under extreme conditions, the DC life testing was conducted on A1. The initial C&ESR was tested first and used as the 0 h DC life's C&ESR results. Then, this cell was held under the maximum operating voltage 3.8 V by a power supply in a 65° C. oven for 2000 h total. To conduct DC life test, the cell was taken out of the oven after certain hours. After cooled down to room temperature, cell was retested its C&ESR, and DC life data was recorded after cell being kept 100, 200, 300, 500, 750, 1000, 1500 and 2000 h in the oven. The C&ESR percentage changes during the DC life is shown in FIGS. 6A and 6B. It can be observed from FIG. 6A that after 2000 h DC life testing, the C maintains 93% of the initial value and ESR only increases about 30% of the initial value at 0 h. DC life results prove that the LIC cell A1 has stable electrochemical performance when the cell is held under 3.8 V in an environment of 65° C.

Figure 7A:
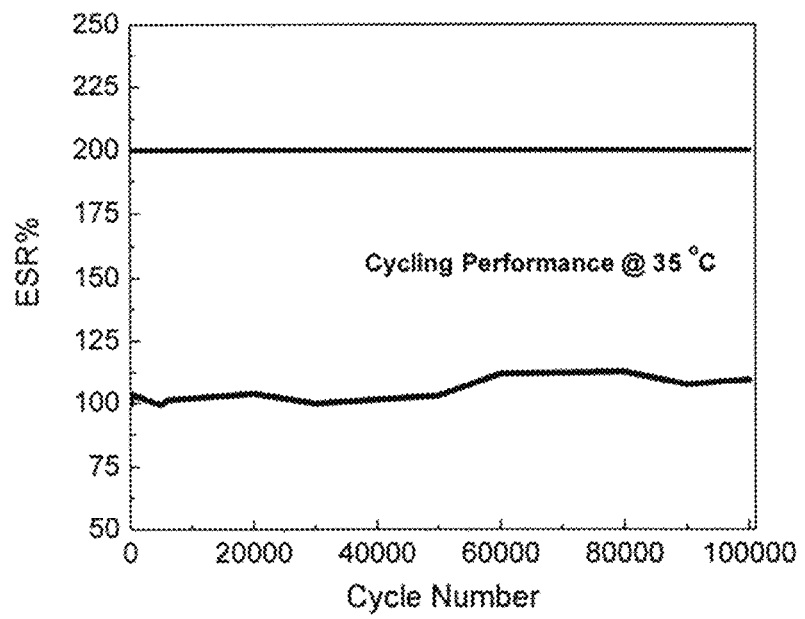
FIG. 7A illustrates the cycling performance of the LIC cell A1 under a constant current of 4 A charge-discharge from 3.8 to 2.2 V with regard to Capacitance.
Figure 7B:
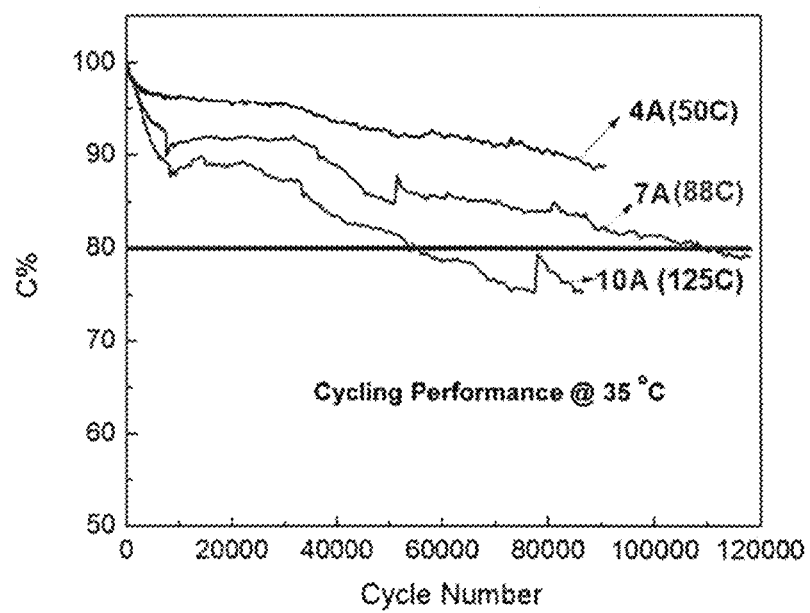
FIG. 7B illustrates the cycling performance of the LIC cell A1 under a constant current of 4 A charge-discharge from 3.8 to 2.2 V with regard to ESR percentage changes as a function of cycle number.

To obtain the cycle life of the LIC cell A1 under various charge-discharge rates, the cell was charging and discharging for more than 100,000 cycles under constant currents of 4 A (50 C rate), 7 A (88 C rate) and 10 A (125 C rate). FIGS. 7A and 7B present the cycling performance for LIC cell A1 with extended cycles under 4 A which is a 50 C charge-discharge rate at a temperature of 35° C. It can be seen from FIGS. 7A and 7B that after 100,000 cycles, the C still maintains about 89% of the initial value and ESR only increases 10% from the initial value, which demonstrate that LIC cell A1 can achieve a cycle life of more than 100,000 cycles. FIG. 7C displays the cycle life comparison results when the cell is cycling under various rates. It is obvious that the cycle life performance is getting worse when the charge-discharge rate is increasing from 50 C (4 A) to 125 C (10 A). However, even under a charge-discharge rate as high as 125 C, the cell A1 is still able to achieve more than 50,000 cycles, which is enough for numerous LIC applications.

Figure 19:
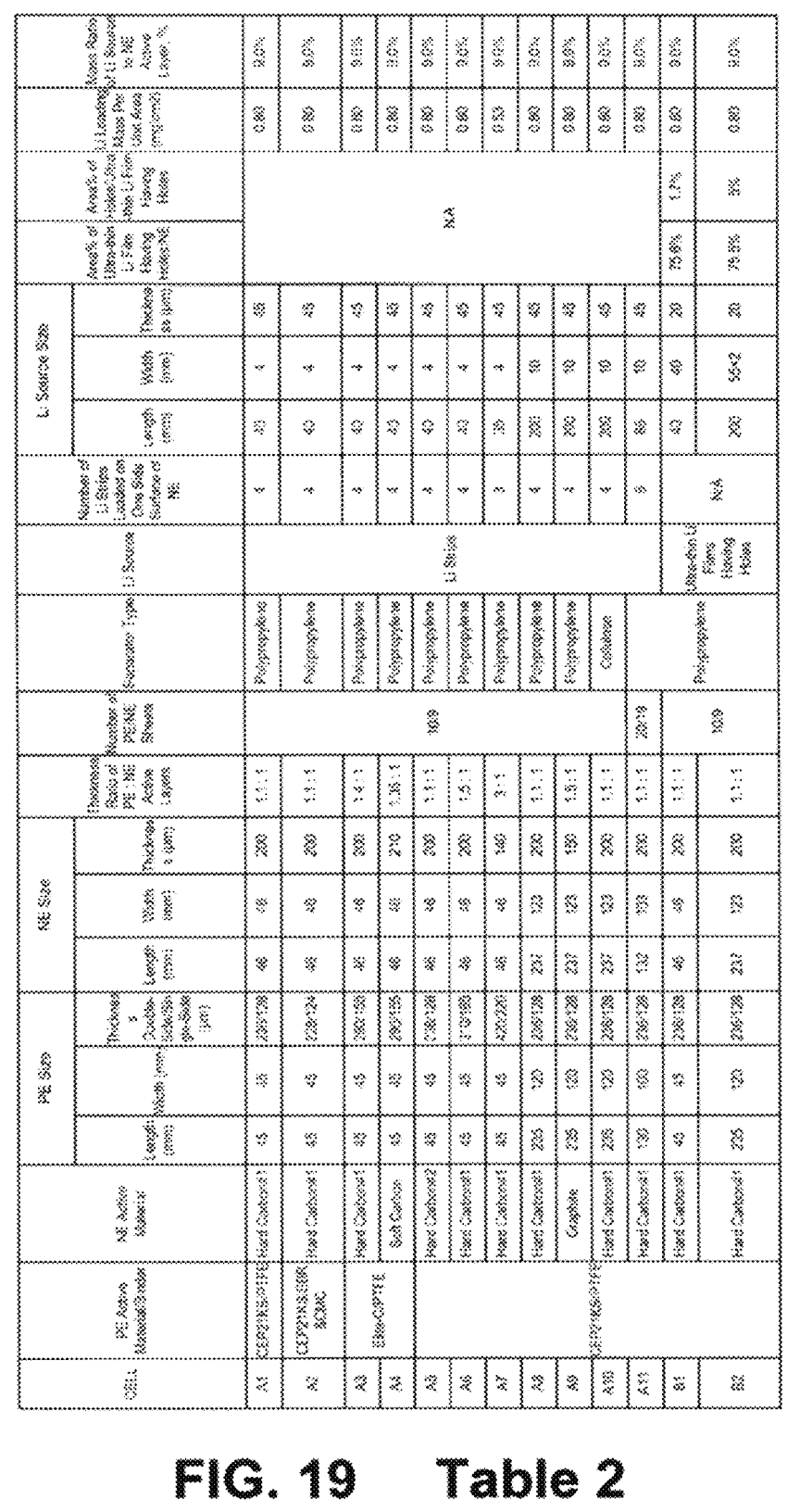

Referring now to FIG. 19, TABLE 2 is shown which illustrates the characteristics of example cells A1 through C1 with regard to positive electrode active material and binder, negative electrode active material, positive and negative electrode thicknesses, thickness ratio of total thickness of the positive electrode active layers to the total thickness of the negative electrode active layers, capacity ratio of positive electrode to negative electrode active layers, the number of positive sheets, positive and negative electrode size, separator types, mass per unit area of Li strips or ultra-thin Li films having holes pre-loaded on one side surface of negative electrode, the length, width and thickness of Li strips or ultra-thin Li films having holes pre-loaded on one side surface of negative electrodes, number of Li strips pre-loaded on one side surface of negative electrode, the area percentage of ultra-thin Li films having holes pre-loaded on one side surface of negative electrode to the area of negative electrode, the area size percentage of holes in ultra-thin Li films having holes pre-loaded on surface of negative electrode and the mass ratio percentage of Li strips or ultra-thin Li films having holes pre-loaded on one side surface of negative electrode to the one side negative electrode active layer.

FIG. 20 represents TABLE 3 which illustrates the characteristics of cells A1 through C1 with regard to total final cell weight, LIC size, capacitance, DC-ESR, specific energy, energy density, maximum specific power, maximum power density, cycle life capacitance retention (%) and DC-ESR retention (%), DC life capacitance retention (%) and DC-ESR retention (%), all again for example cells A1 through C1. Explanation of those example cells continues below.

Example 2-A2

Experimental

A LIC cell for a test and evaluation (hereinafter referred to as "A2") was produced in the same manner as in Example 1 (A1) except that the fabrication of the positive electrode is changed as described below in the production of the LIC cell A2. In example A2, the positive electrode was prepared by coating a slurry mixture (de-ion water is the solvent for slurry) of AC/carbon black (CB), SBR/CMC as binder by the mass ratio of 91:5:3:1 onto an Al foil substrate (Exopack™, 20 μm in thickness). The positive electrode formulation can be adjusted in a range of mass ratio between AC/CB and SBR/CMC. The mass ratio between SBR and CMC can be from 3:1 to 1:3. The mass ratio between AC and CB can be from 90:10 to 99:1. The ratio between the total mass of AC and CB to the total mass of SBR and CMC can be from 85:15 to 98:2. The AC material was CEP21KS (Power Carbon Technology Co., Ltd., Korea); the CB material was Timical Super C45 (MTI Corporation); the CMC material was Cellogen BSH-6 (Dai-Ichi Kogyo Seiyaku. Co., Ltd., Japan); the SBR material was SSBR100 (Targray Technology International Inc). Then the electrodes were dried at 50° C. with flowing air. After all the electrodes were dried, a hot-roll pressing was applied to form a better contact between the active material and metal substrate. The fabricated positive electrode thickness is 228 μm.

Results and Discussion

Figure 8A:
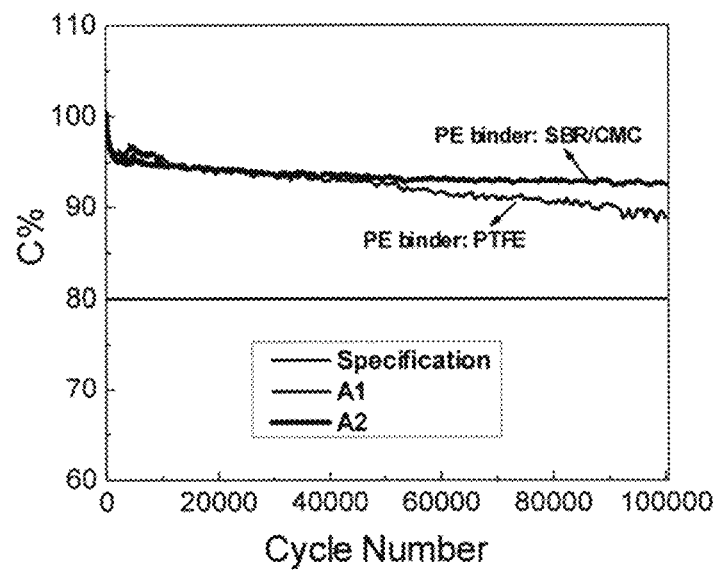
FIG. 8A illustrates the cycling performance of the LIC cell A1 & A2 under a constant current of 4 A charge-discharge from 3.8 to 2.2 V with regard to Capacitance.
Figure 8B:
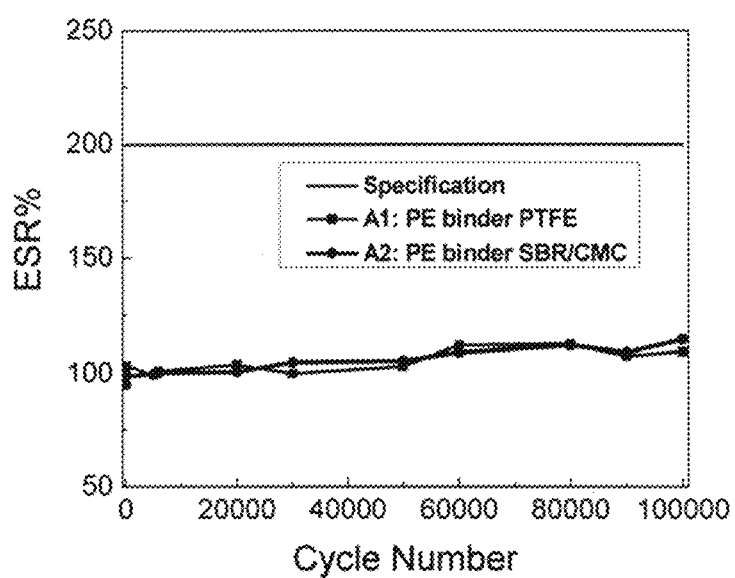
FIG. 8B illustrates the cycling performance of the LIC cell A1 & A2 under a constant current of 4 A charge-discharge from 3.8 to 2.2 V with regard to ESR percentage changes as a function of cycle number.
Figure 9A:
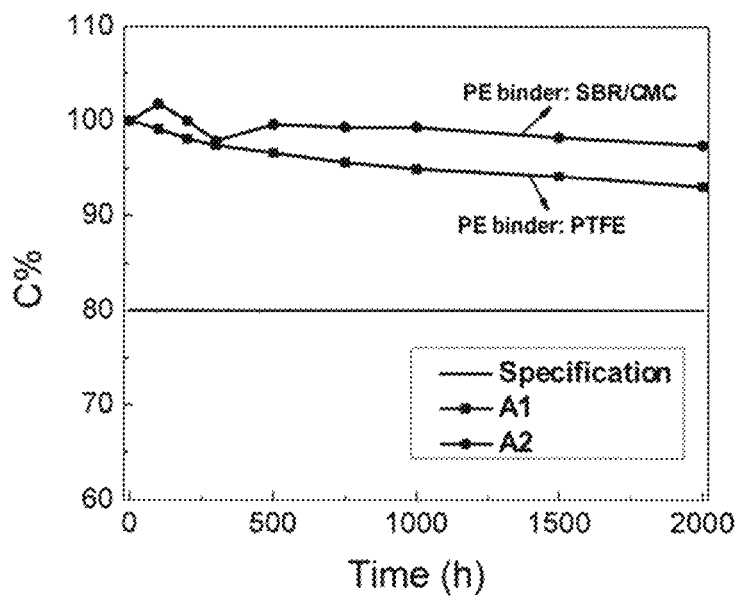
FIG. 9A illustrates the DC life performance of the LIC cell A1 & A2 held at maximum voltage 3.8 V under 65° C. with regard to Capacitance.
Figure 9B:
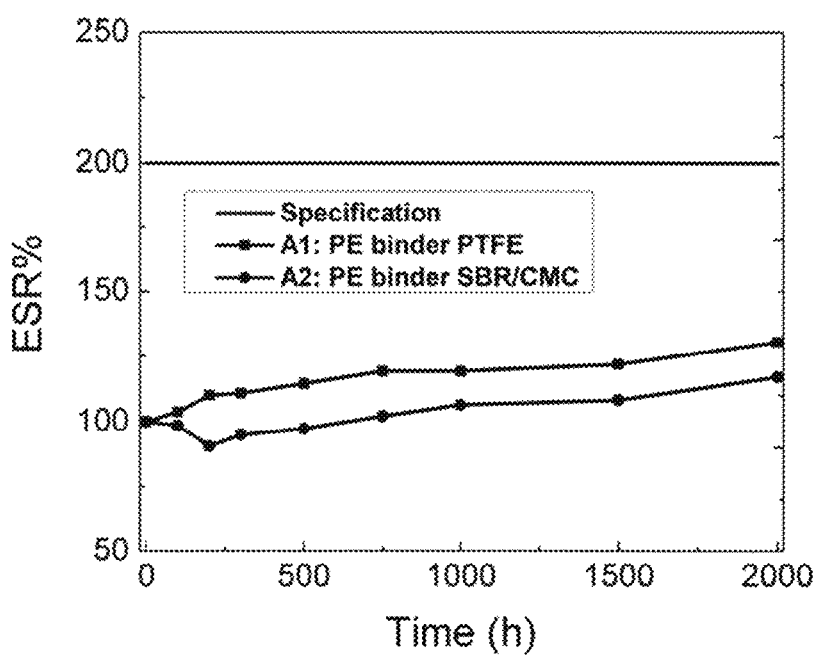
FIG. 9B illustrates the DC life performance of the LIC cell A1 & A2 held at maximum voltage 3.8 V under 65° C. with regard to ESR percentage changes as a function of time.

FIG. 8 displays the cycle life performance of LICs for Example A1 and A2. Two cells were charged and discharged from 2.2 to 3.8 V under the same current. After 100,000 cycles, the capacitance of LIC A2 maintains 92.5% of initial value which is higher than that for Example A1 (88.7%), and the $ESR_{DC}$ of LIC A1 keeps 109% of initial value which is lower than that for Example A2 (114%). FIGS. 9A and 9B shows the DC life performance of LICs for Example A1 and A2. Two cells were charged to 3.8 V and held at 3.8 V at 65° C. After 2,000 h, the capacitance of LIC for Example A2 maintains 97.4% of initial value which is much higher than that for A1 (93%), and the $ESR_{DC}$ of LIC for Example A2 keeps 117.1% of initial value which is much lower than that for Example A1 (130.4%). Thus, the results in FIGS. 8A, 8B, 9A and 9B demonstrate that the LIC using the wet method of positive electrode manufacturing with SBR/CMC as the binders show improved cycle life and DC life performance than dry method fabricated positive electrode with PTFE as the binder.

The summary of the cell components and parameters for LIC cell A2 is shown in FIG. 19 representing TABLE 2 described below and the results of the evaluation are also in FIG. 20 representing TABLE 3 described below.

Example 3-A3

Experimental

A LIC cell for a test and evaluation (hereinafter referred to as "A3") was produced in the same manner as in Example 1 (A1) except that the positive electrode active material in the stacking cell core unit is changed from CEP21KS to Elite-C (EC, Calgon Carbon, USA) which has a surface area of about 1700 m²/g, the thickness of the double-side coated positive electrode sheets in the cell core unit is changed from 236 μm to 290 μm and the thickness of the top and bottom single-side coated positive electrode sheets in the cell core unit is changed from 128 μm to 155 μm in the production of the LIC cell A3. The thickness ratio of the total thickness of the PE active layer to the total thickness of NE active layer in example A3 is about 1.4:1.

Results and Discussion

The summary of the cell components and parameters for LIC cell A3 is shown in FIG. 19 representing TABLE 2 described below and the results of the evaluation are also in FIG. 20 representing TABLE 3 described below.

Example 4-A4

Experimental

A LIC cell for a test and evaluation (hereinafter referred to as "A4") was produced in the same manner as in. Example 3 (A3) except that the fabrication of negative electrode is changed as described below in the production of the LIC cell A4. In example A4, the negative electrode was prepared by coating a slurry mixture (de-ion water is the solvent for slurry) of soft carbon (SC), SBR/CMC as binder, by the mass ratio of 96:311 onto a Cu foil substrate with 10 μm in thickness. The CMC material was Cellogen BSH-6 (Dai- Ichi Kogyo Seiyaku Co., Ltd., Japan); the SBR material was SSBR100 (Targray Technology International Inc). Then the electrodes were dried at 50° C. with flowing air. After all the electrodes were dried, a hot-roll pressing was applied to form a better contact between the active material and metal substrate. The fabricated SC based negative electrode thickness is 210 μm. The thickness ratio of the total thickness of the PE active layer to the total thickness of NE active layer in example A4 is about 1.35:1. The capacity ratio of PE:NE active layers is about 1:5.

Results and Discussion

Figure 10A:
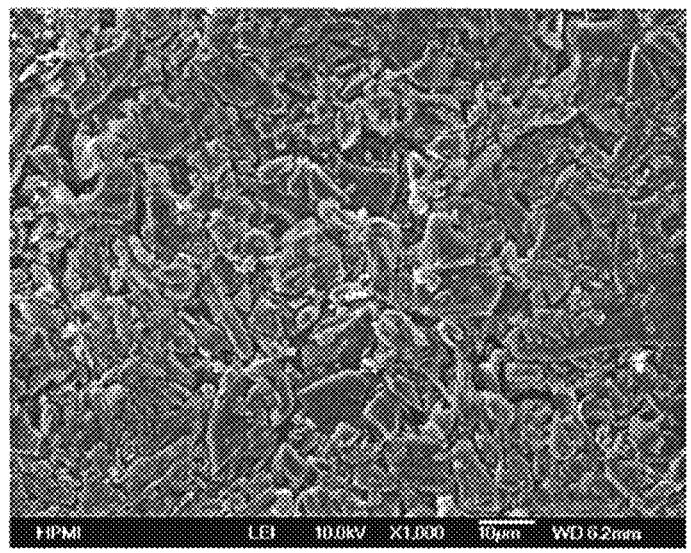
FIG. 10A shows a scanning electron micrograph (SEM) image of a soft carbon negative electrode in Example A4.

The SEM image of SC electrode is shown in FIG. 10A. It can be seen from FIG. 10A that the particle size of SC is about 5~10 μm. The summary of the cell components and parameters for LIC cell A4 is shown in FIG. 19 representing TABLE 2 described below and the results of the evaluation are also in FIG. 20 representing TABLE 3 described below.

Example 5-A5

Experimental

A LIC cell for a test and evaluation (hereinafter referred to as "A5") was produced in the same manner as in Example 1 (A1) except that that the fabrication of negative electrode is changed as described below in the production of the LIC cell A5. In example A5, the negative electrode was prepared by coating a slurry mixture (de-ion water is the solvent for slurry) of hard carbon#2 (J2, particle size D50 is 3 μm), SBR/CMC as binder by the mass ratio of 96:3:1 onto a Cu foil substrate with 10 μm in thickness. The CMC material was Cellogon (Dai-Ichi Kogyo Seiyaku Co., Ltd., Japan); the SBR material was SSBR100 (Targray Technology International Inc). Then the electrodes were dried at 50° C. with flowing air. After all the electrodes were dried, a hot-roll pressing was applied to form a better contact between the active material and metal substrate. The fabricated J2 based negative electrode thickness is 200 μm. The thickness ratio of the total thickness of the PE active layer to the total thickness of NE active layer in example A5 is about 1.1:1.

Results and Discussion

Figure 10B:
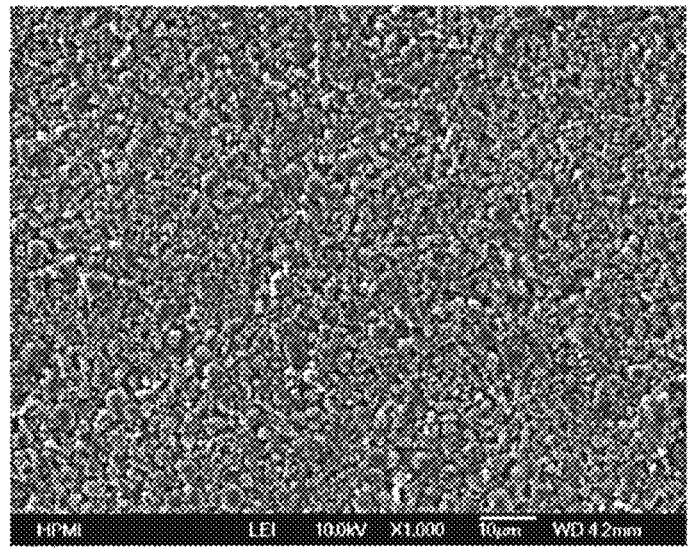
FIG. 10B shows a scanning electron micrograph (SEM) image of a hard carbon#2 negative electrode J2 in Example A5.

The SEM image of J2 electrode is shown in FIG. 10B. It can be seen from FIG. 10B that the average particle size of J2 is about 3 μm. The summary of the cell components and parameters for LIC laminate cell A5 is shown in FIG. 19 representing TABLE 2 described below and the results of the evaluation are also in FIG. 20 representing TABLE 3 described below.

Example 6-A6

Experimental

A LIC cell for a test and evaluation (hereinafter referred to as "A6") was produced in the same manner as in Example 1 (A1) except that the thickness of the double-side coated positive electrode sheets in the stacking cell core unit is changed from 236 μm to 310 μm and the thickness of the single-side coated positive electrode sheets in the stacking cell core unit is changed from 128 μm to 165 μm in the production of the LIC cell A6. The thickness ratio of the total thickness of the PE active layer to the total thickness of NE active layer in example A6 is about 1.5:1. The capacity ratio of PE:NE active layers is about 1:5.

Results and Discussion

The summary of the cell components and parameters for LIC cell A6 is shown in FIG. 19 representing TABLE 2 described below and the results of the evaluation are also in FIG. 20 representing TABLE 3 described below.

Example 7-A7

Experimental

A LIC cell for a test and evaluation (hereinafter referred to as "A7") was produced in the same manner as in Example 1 (A1) except that the thickness of the double-side coated positive electrode sheets in the stacking cell core unit is changed from 236 μm to 420 μm, the single-side coated positive electrode sheets in the stacking cell core unit is changed from 128 μm to 220 μm, the thickness of the negative electrode sheets in the cell core unit is changed from 200 μm to 140 μm, the number of Li strips pre-loaded on one side surface of negative electrode is changed from 4 to 3 and the length of Li strips pre-loaded on one side surface of negative electrode is changed from 40 to 35 mm in the production of the LIC cell A7. The thickness ratio of the total thickness of the PE active layer to the total thickness of NE active layer in example A7 is about 3:1. The mass per unit area of the Li strips loaded onto one side surface of the NE in example A7 is 0.53 mg/cm$^2$. The capacity ratio of PEN E active layers is about 1:3.

Results and Discussion

The summary of the cell components and parameters for LIC laminate cell A7 is shown in FIG. 19 representing TABLE 2 described below and the results of the evaluation are also in FIG. 20 representing TABLE 3 described below.

Example 8-A8

Experimental

Figure 11A:
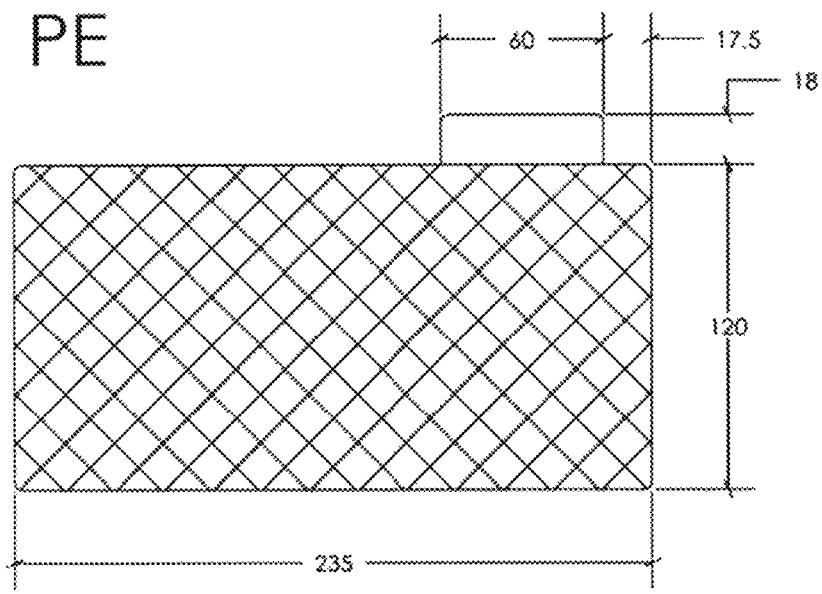
FIG. 11A depicts a sketch of PE with specifications marked.
Figure 11B:
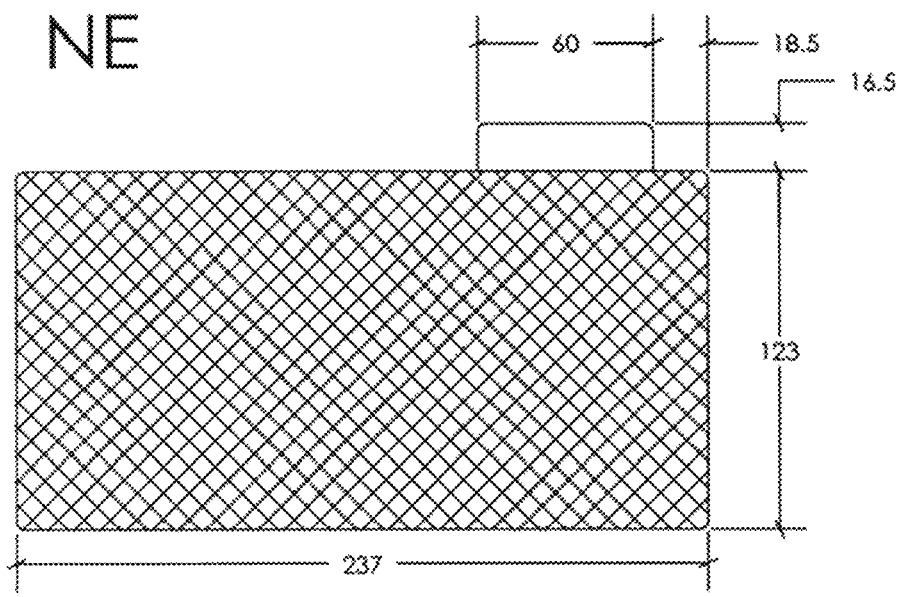
FIG. 11B depicts a sketch of NE with specifications marked.
Figure 11C:
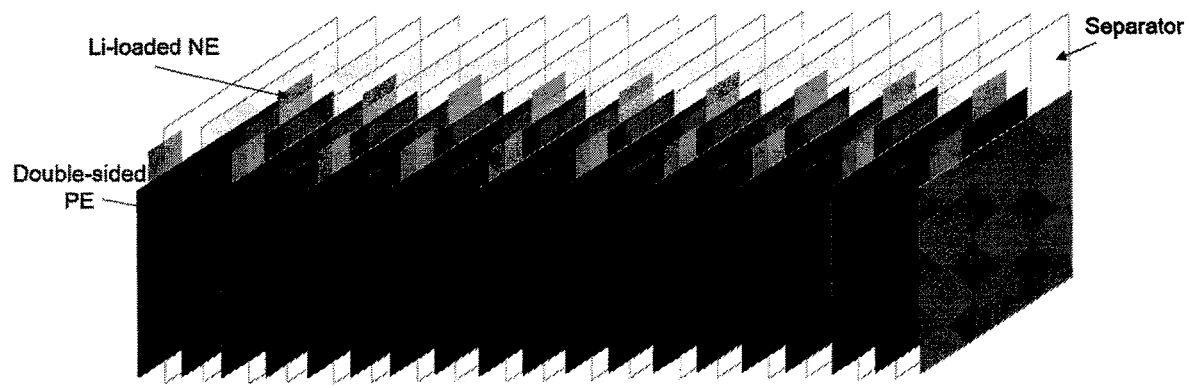
FIG. 11C depicts a schematic illustration of 3000F LIC cell A8 (9 NEs and 10 PEs).
Figure 11D:
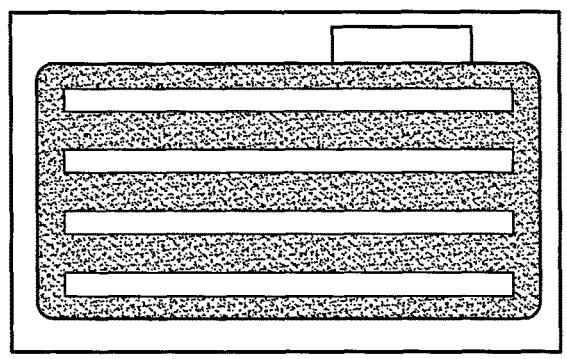
FIG. 11D depicts a picture of Li-loaded NE.
Figure 11E:
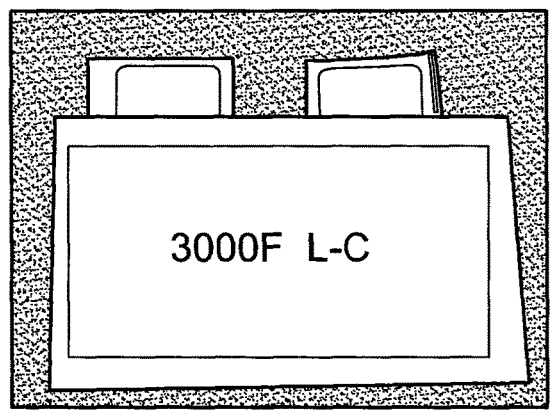
FIG. 11E depicts a picture of finalized cell A8.

A LIC laminate cell for a test and evaluation (hereinafter referred to as "V8") was produced in the same manner as in Example 1 (A1) except that the size of the positive electrode sheets in the stacking cell core unit is changed to the size as shown in FIG. 11A, the size of the negative electrode sheets in the cell core unit is changed to the size as shown in FIG. 11B and the length and width of Li strips pre-loaded on one side surface of NE is changed to 200 mm and 10 mm as shown in FIG. 11D in the production of the LIC cell A8. In example A8, the length and width of PE are 235 mm and 120 mm with 18 mm length and 60 mm width tab; the length and width of NE are 237 mm and 123 mm with 16.5 mm length and 60 mm width tab. The stacking cell core unit structure is shown in FIG. 11C and the picture of final cell is displayed in FIG. 11E. In example A8, the capacitance (C) and DC-ESR were obtained by charging-discharging the LIC cell A8 under a constant current of 1.2 A as 1 C rate and 60 A as 50 C rate both for 3 cycles with 15 s rest time between each charge and discharge steps. 2000 hours DC life was conducted to the LIC cell A8 by holding the cell at maximum operating voltage 3.8 V in a 65° C. oven. The LIC cell A8 was finally charged and discharged under a constant current of 60 A for 100,000 cycles to obtain the cycling performance under 50 C charge-discharge rates.

Results and Discussion

The summary of the cell components and parameters for LIC cell A8 is shown in FIG. 19 representing TABLE 2 described below and the results of the evaluation are also in FIG. 20 representing TABLE 3 described below.

Example 9-A9

Experimental

A LIC cell for a test and evaluation (hereinafter referred to as "A9") was produced in the same manner as in Example 8 (A8) except that the negative electrode active material is changed from hard carbon 1 (HC1) to graphite and the thickness of the negative electrode is changed from 200 μm to 150 μm m the production of the LIC cell A9. The thickness ratio of the total thickness of the PE active layer to the total thickness of NE active layer in example A9 is about 1.5:1.

Results and Discussion

Figure 12:
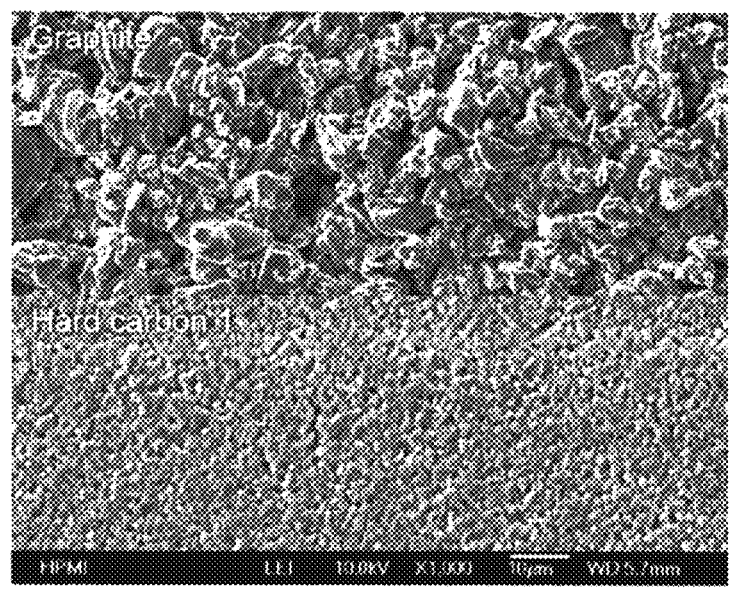
FIG. 12 shows a SEM image of graphite and hard carbon 1 surface.

The SEM images of the hard carbon 1 and graphite electrodes are shown in FIG. 12. It can be seen from the FIG. 12 that the average particle size of graphite is much larger than HC1. The summary of the cell components and parameters for LIC cell A9 is shown in FIG. 19 representing TABLE 2 described below and the results of the evaluation are also in FIG. 20 representing TABLE 3 described below.

Example 10-A10

Experimental

A LIC cell for a test and evaluation (hereinafter referred to as "A10") was produced in the same manner as in Example 8 (A8) except that the separator material is changed from PP to cellulose based separator TF40-50 (NKK Nippon Kodoshi Corp., Japan) in the production of the LIC cell A10.

Results and Discussion

The summary of the cell components and parameters for LIC cell A10 is shown in FIG. 19 representing TABLE 2 described below and the results of the evaluation are also in FIG. 20 representing TABLE 3 described below.

Example 11-A11

Experimental

Figure 13A:
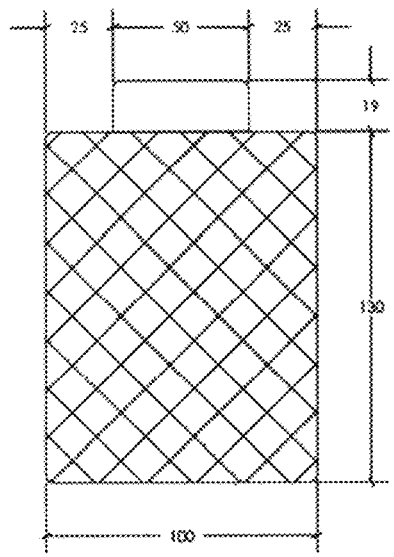
FIG. 13A depicts a sketch of PE with specifications marked.
Figure 13B:
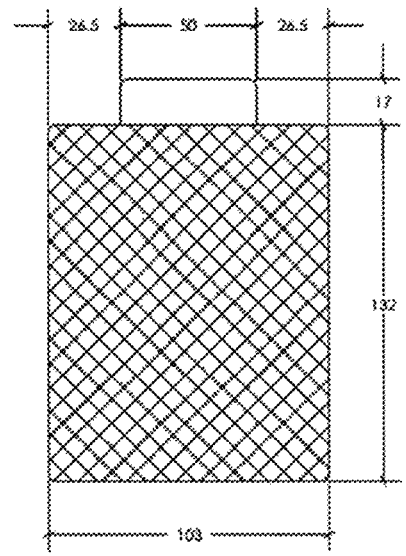
FIG. 13B depicts a sketch of NE with specifications marked.
Figure 13C:
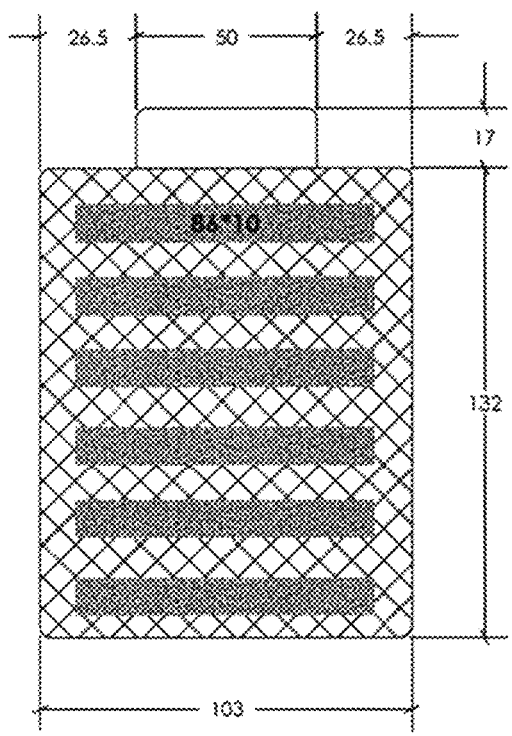
FIG. 13C depicts the design of Li strips pre-loaded on negative electrode.
Figures 13D, 13E:
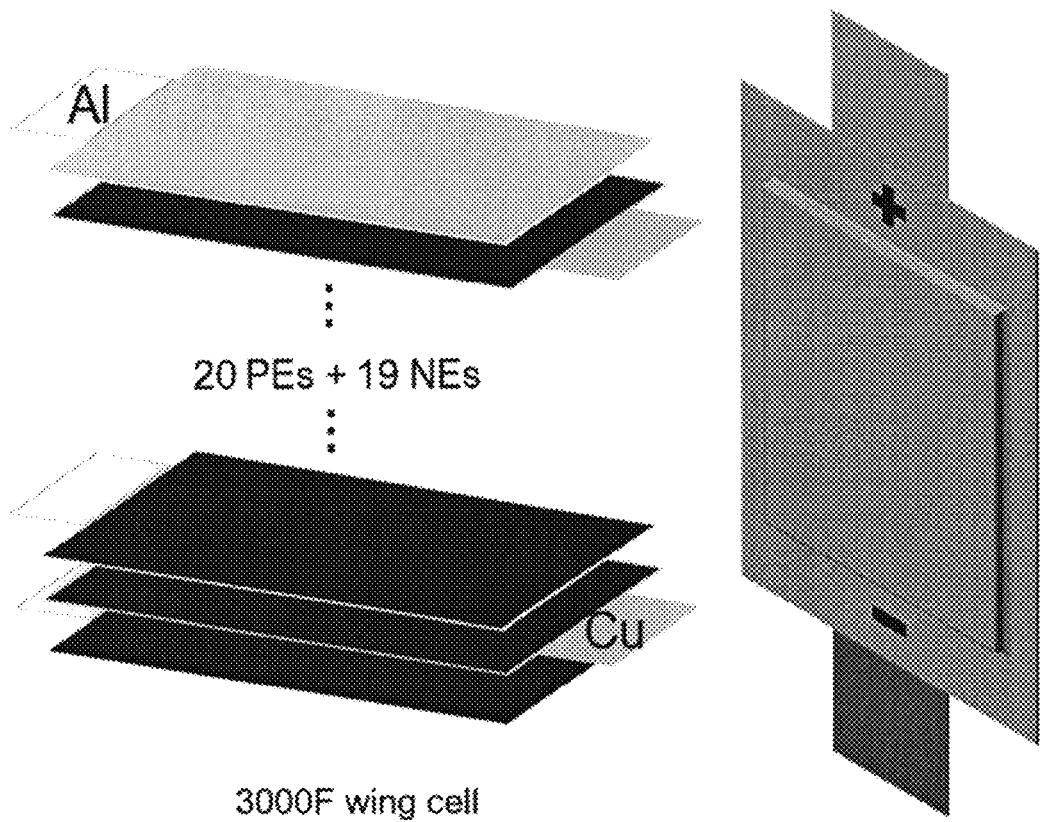
FIG. 13D depicts a schematic illustration of 3000F LIC cell A11 in wing cell design (19 NEs and 20 PEs, separators between PEs and NEs are ellipsised).
FIG. 13E depicts a schematic representation of finalized wing 3000F cell.

A LIC laminate cell for a test and evaluation (hereinafter referred to as "A11") was produced in the same manner as in Example 8 (A8) except that the size of the positive electrode sheets in the stacking cell core unit is changed to the size as shown in FIG. 13A, the size of the negative electrode sheets in the cell core unit is changed to the size as shown in FIG. 13B, the length and width of Li strips pre-loaded on one side surface of NE is changed to 86 mm and 10 mm and the number of Li strips pre-loaded on one side of negative electrode is changed from 4 to 6 as shown in FIG. 13C, the number of positive electrode sheets is changed from 10 to 20 and the number of negative electrode sheets is, changed from 9 to 19 as shown in FIG. 13D in the production of the LIC cell A11. In example A11, the length and width of PE are 130 mm and 100 mm with 19 mm length and 50 mm width tab; the length and width of NE are 132 mm and 103 mm with 17 mm length and 50 mm width tab. The schematic representation of final cell is displayed in FIG. 13E.

Results and Discussion

The summary of the cell components and parameters for LIC cell A11 is shown in FIG. 19 representing TABLE 2 described below and the results of the evaluation are also in FIG. 20 representing TABLE 3 described below.

Example 12 -B1

Experimental

Figure 14:
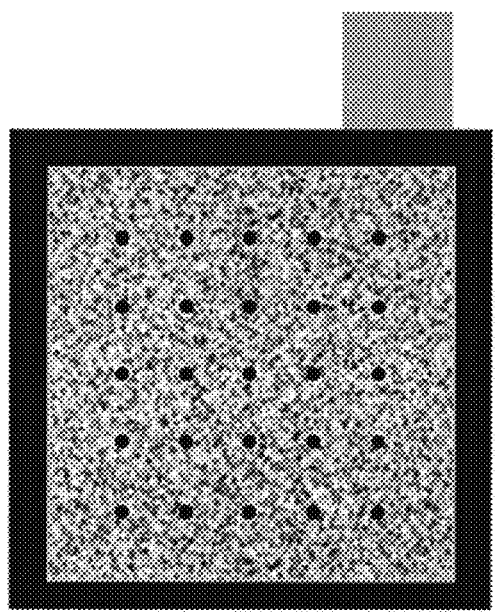
FIG. 14 is a schematic representation of the 46×46 mm hard carbon negative electrode with 20 µm ultra-thin Li film (Li film size: 40 mm*40 mm) having 25 holes drilled on ultra-thin Li film loaded on the surface for LIC cell B1.

A LIC cell for a test and evaluation (hereinafter referred to as "B1") was produced in the same manner as in Example 1 (A1) except that Li sources pre-loaded on one side surface of negative electrode is changed from four Li strips with size of 40 mm×4 mm×45 μm (length×width×thickness) to one piece of ultra-thin Li film having holes (25 holes) with size of 40 mm×40 mm×20 μm (length×width×thickness) as shown in FIG. 14 in the production of the LIC cell B1. In example B1, the area of the ultra-thin Li films having holes pre-loaded on one side of negative electrode is about 75.6% of the area of the negative electrode. The percentage of total area of 25 holes in the ultra-thin Li films having holes pre-loaded on surface of negative electrode is about 1.7%.

Results and Discussion

Figure 15A:
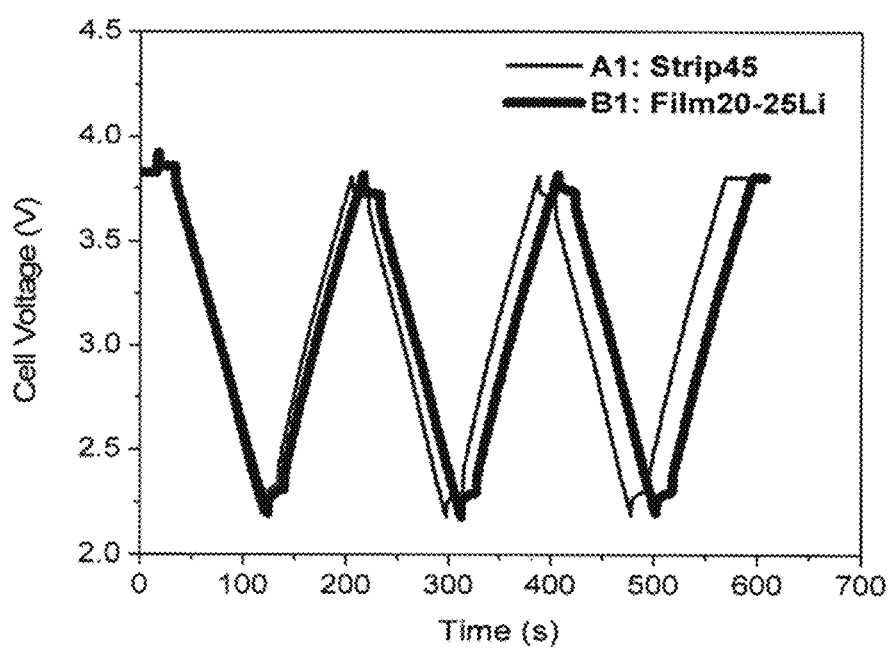
FIG. 15A graphically illustrates charge-discharge profiles of 200F LIC cell A1 and B1 with two different Li pre-lithiation methods at a constant current of 4 A from 2.2 to 3.8 V. Cycling performance of A1 (Strip45) and B1 (Film20-25Li) capacitors under a constant current of 4 A charge-discharge from 3.8 to 2.2V.
Figure 15B:
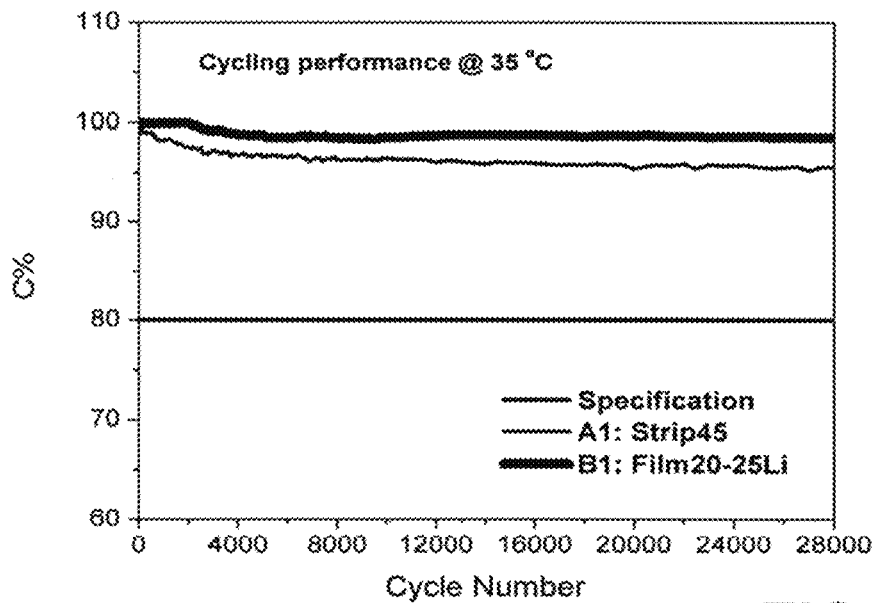
FIG. 15B graphically illustrates charge-discharge profiles of 200F LIC cell A1 and B1 with two different Li pre-lithiation methods at a constant current of 4 A from 2.2 to 3.8 V. Cycling performance of A1 (Strip45) and B1 (Film20-25 Li) capacitors under a constant current of 4 A charge-discharge from 3.8 to 2.2V with regard to capacitance.
Figure 15C:
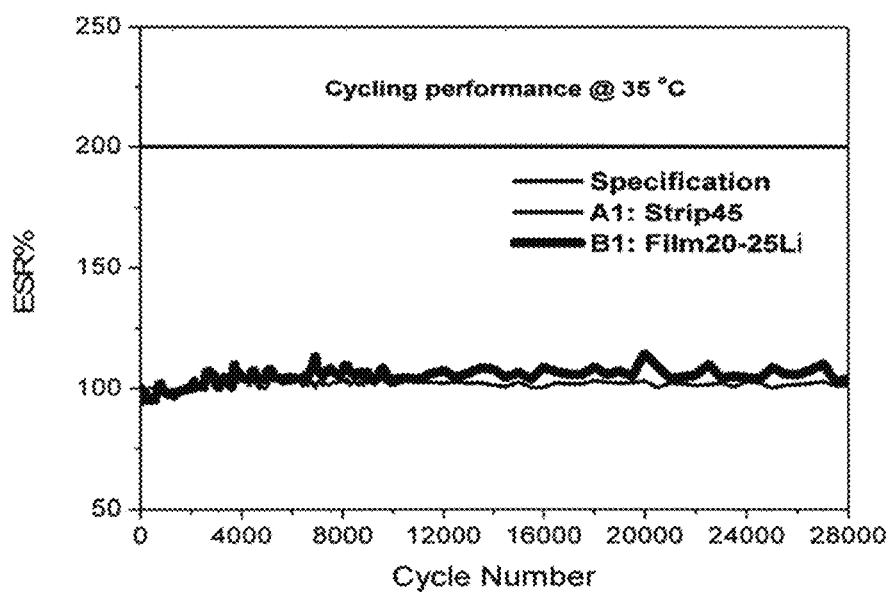
FIG. 15C graphically illustrates charge-discharge profiles of 200F LIC cell A1 and B1 with two different Li pre-lithiation methods at a constant current of 4 A from 2.2 to 3.8 V. Cycling performance of A1 (Strip45) and B1 (Film20-25Li) capacitors under a constant current of 4 A charge-discharge from 3.8 to 2.2V with regard to ESR percentage change as a function of cycle number. DC life test results of A1 (Strip45) and B1 (Film20-25Li) capacitors.
Figure 15:
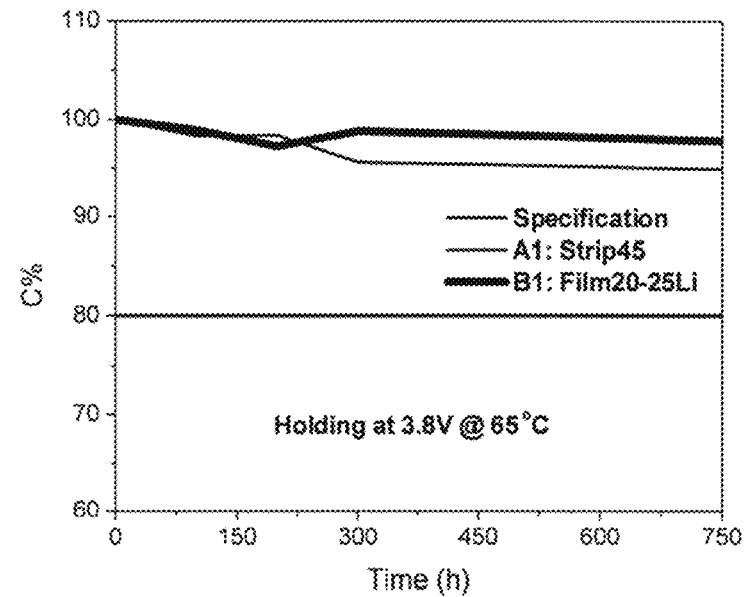
FIG. 15D graphically illustrates charge-discharge profiles of 200F LIC cell A1 and B1 with two different Li pre-lithiation methods at a constant current of 4 A from 2.2 to 3.8 V. Cycling performance of A1 (Strip45) and B1 (Film20-25Li) capacitors under a constant current of 4 A charge-discharge front 3.8 to 2.2V illustrating Capacitance vs. Time.
FIG. 15E graphically illustrates charge-discharge profiles of 200F LIC cell A1 and B1 with two different Li pre-lithiation methods at a constant current of 4 A from 2.2 to 3.8 V. Cycling performance of A1 (Strip45) and B1 (Film20-25Li) capacitors under a constant current of 4 A charge-discharge from 3.8 to 2.2V illustrating ESR vs. Time.
Figure 15E:
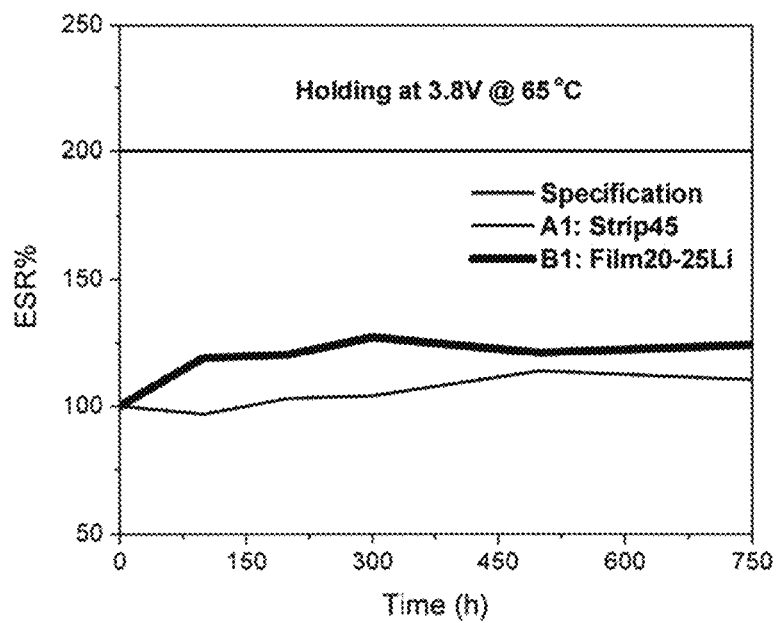

Initial tests were conducted under 1 C rate (80 mA) and 50 C rate (4). Energy and power were calculated using weight and dimension of whole cells (with the interfere of cell case). For LIC cell B1 (Film20-25Li 200F LIC), capacitance has a 3.8% increase comparing to LIC cell A1 (Strip45), while DC-ESR has a 16% drop. These changes result in 3-4% improvement in energy and ~19% in power as shown in TABLE 3. As shown in TABLE 3, LIC cell B1 has reached high energy and power densities (25.9 Wh/L and 14.6 kW/L). That is to say, new pre-lithiation method with Li thin film having holes can not only facilitate the lithiation process but also excite the potential of electrodes. Cell B1's charge-discharge profile for 3 full cycles in the voltage range of 2.2-3.8V under a constant current of 4 A (50 C rate) is displayed in FIG. 15A. Longer charge-discharge time of cell B1 indicates that more electric energy can be stored in the LIC, therefore, higher capacitance can be reached. Cycle life and DC life testing was conducted tinder same voltage and temperature environment, however, all test results showing in FIGS. 15A through 15E were tested under 4 A charge-discharge current. From that, Film20-25Li 200F LIC B1 can still maintain better performance than Strip45 cell A1. 28000 cycles have been reached and DC life has finished 750 h constantly charging at 3.8V in 65° C. environment.

The summary of the cell components and parameters for LIC cell B1 is shown in FIG. 19 representing TABLE 2 described below and the results of the evaluation are also in FIG. 20 representing TABLE 3 described below.

Example 13 -B2

Experimental

Figure 16:
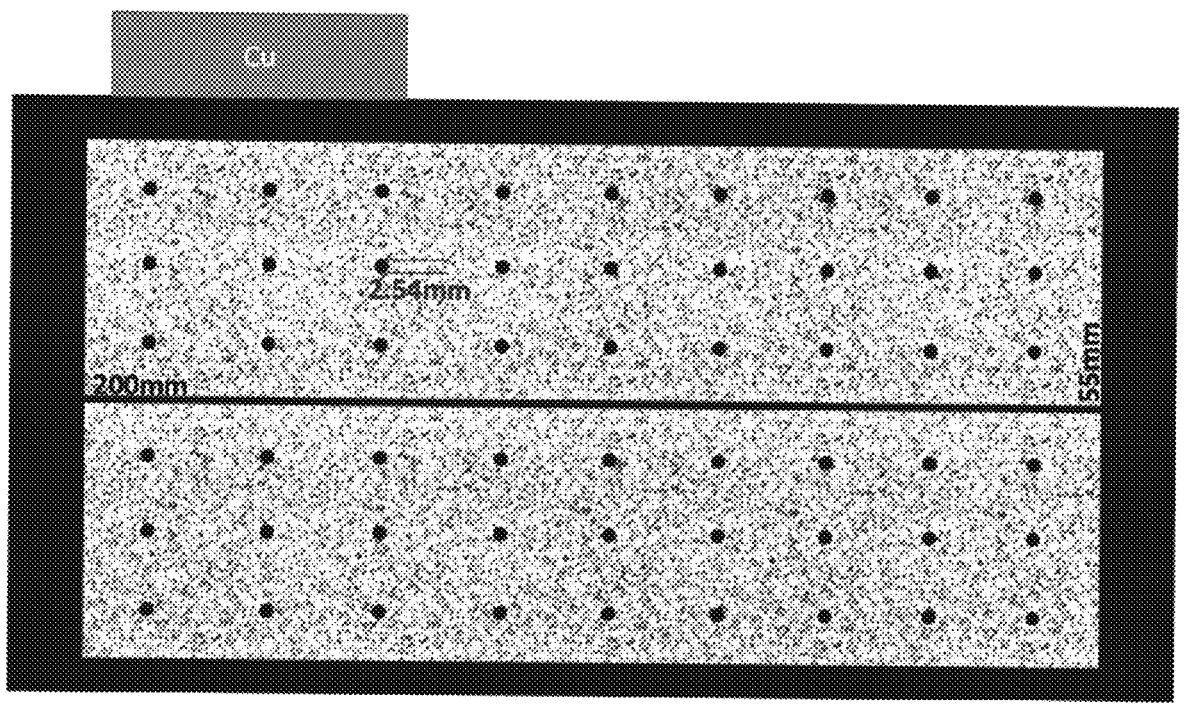
FIG. 16 depicts a schematic representation of the 237×123 mm hard carbon negative electrode with two pieces of 20 µm ultra-thin Li film (Li film size: 200 mm*55 mm) having 27 holes drilled on each piece of ultra-thin Li film pre-loaded on the surface for LIC cell B2.

A LIC cell for a test and evaluation (hereinafter referred to as "B2") was produced in the same manner as in Example 8 (A8) except that Li sources pre-loaded on one side surface of negative electrode is changed from four Li strips with size of 200 mm×10 mm×45 μn (length×width×thickness) to two pieces of ultra-thin Li film having holes (2.7 holes) with size of 200 mm×55 mm×20 μm (length×width×thickness) as shown in FIG. 16 in the production of the LIC cell B2. In example B2, the area of the ultra-thin Li films having holes pre-loaded on one side of negative electrode is about 75.5% of the area of the negative electrode. The percentage of total area of 27 holes in each piece of the ultra-thin Li films having holes pre-loaded on surface of negative electrode is about 5%.

Results and Discussion

The summary of the cell components and parameters for LIC cell B2 is shown in FIG. 19 representing TABLE 2 described below and the results of the evaluation are also in FIG. 20 representing TABLE 3 described below.

Example 14-B3

Experimental

Figure 17:
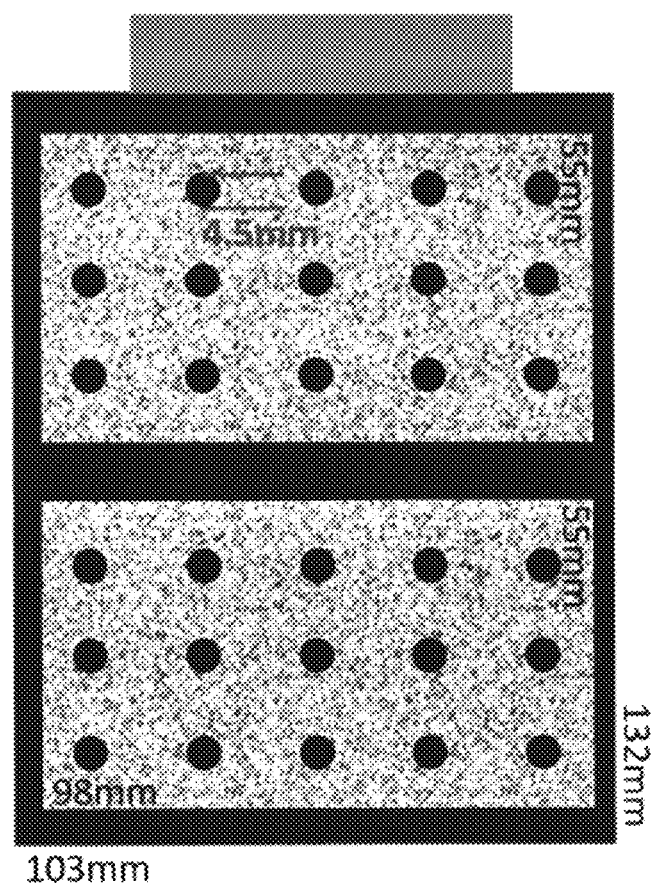
FIG. 17 depicts a schematic representation of the 132×103 mm hard carbon negative electrode with two pieces of 20 µm ultra-thin Li film (Li film size: 98 mm*55 mm) having 15 holes with diameter of 4.5 mm drilled on each piece of ultra-thin Li film loaded on the surface for LIC cell B3.

A LIC cell for a test and evaluation (hereinafter referred to as "B3") was produced in the same manner as in Example 11 (A11) except that Li sources pre-loaded on one side surface of negative electrode is changed from six Li strips with size of 86 mm×10 mm×45 μm (length×width×thickness) to two pieces of ultra-thin Li film having holes (15 holes) with size of 98 mm×55 mm×20 μm (length×width×thickness) as shown in FIG. 17 in the production of the LIC cell B3. In example B3 the area of the ultra-thin Li films having holes pre-loaded on one side of negative electrode is about 83.3% of the area of the negative electrode. The percentage of total area of 15 holes in each piece of the ultra-thin Li films having holes pre-loaded on surface of negative electrode is about 4.4%. The mass per unit area of the ultra-thin Li films having holes loaded onto one side surface of the NE in example B3 is 0.85 mg/cm$^2$. The mass ratio of Li sources loaded to NE active layer weight is about 9.6% as shown in TABLE 2.

Results and Discussion

The summary of the cell components and parameters for LIC cell B3 is shown in FIG. 19 representing TABLE 2 described below and the results of the evaluation are also in FIG. 20 representing TABLE 3 described below.

Example 15-C1

Experimental

Figure 18A:
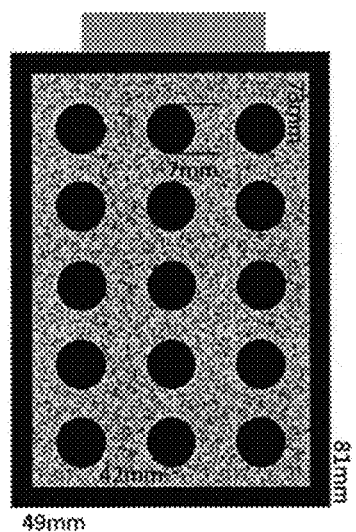
FIG. 18A depicts a schematic representation of the 81×49 mm ultra-thin hard carbon negative electrode with one piece of 5 µm ultra-thin Li film (Li film size: 73 mm*42 mm) having 15 holes with diameter of 7 mm drilled on each piece of ultra-thin Li film loaded on the surface for LIC cell C1.
Figure 18B:
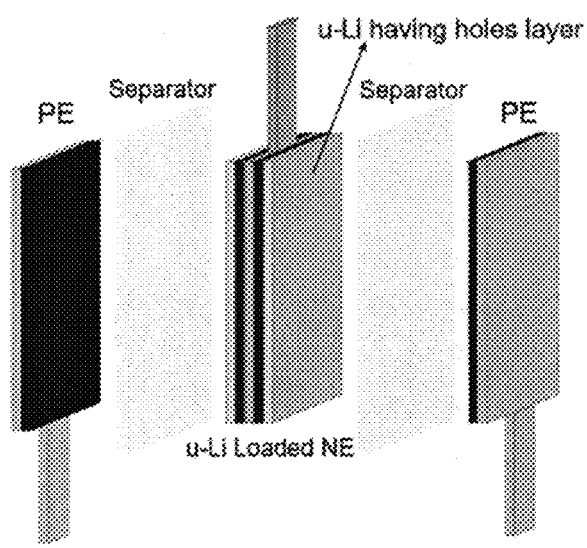
FIG. 18B depicts a schematic illustration of ultra-thin LIC cell C1 in wing cell design (1 double-side NE and 2 single-side PEs).

A ultra-thin LIC cell for a test and evaluation (hereinafter referred to as "C1") was produced in the following procedures. Ultra-thin positive and negative electrodes were produced by wet coating method with SBR/CMC as binders because dry method (PTFE as binders) based electrode fabrication cannot produce electrode film (one-side active layer thickness) less than 50 μm. Two single-side ultra-thin positive electrodes were prepared by coating a slurry mixture (de-ion water is the solvent for slurry) of AC/carbon black (CB), SBR/CMC as binder by the mass ratio of 91:5:3:1 onto an Al foil substrate. The negative electrode was prepared by coating a slurry mixture (de-ion water is the solvent for slurry) of hard carbon 1 (HC1), SBR/CMC as binder by the mass ratio of 96:3:1 onto a Cu foil substrate. The AC material was CEP21KS (Power Carbon Technology Co., Ltd., Korea); the CR material was Timical Super C45 (MTI Corporation); the CMC material was Collagen BSH-6 (Dai-Ichi Kogyo Seiyaku Co., Ltd., Japan); the SBR material was SSBR100 (Targray Technology International Inc). Then the electrodes were dried at 50° C. with flowing air. After all the electrodes were dried, a hot-roll pressing was applied to form a better contact between the active material and metal substrate. The fabricated two single-side positive electrodes' thickness is about 40 μm and the one double-side negative electrode's thickness is about 43 μm as shown in TABLE 2. The thickness ratio of PE:NE active layers is about 0.9:1 and the capacity ratio of PE:NE active layers is about 1:8.6. After the electrode fabrication process, the positive electrodes were punched into the size of 80 mm×48 mm and the negative electrode was punched into the size of 81 mm×49 mm. Li sources pre-loaded on one side surface of negative electrode is one piece of ultra-thin Li film having holes (15 holes) with size of 73 mm×42 mm×5 μm (length× width×thickness) as shown in FIG. 18A in the production of the ultra-thin LIC cell C1. The cell structure of C1, which consisted of two ultra-thin single-side positive electrodes and one ultra-thin double-side negative electrodes pre-loaded with ultra-thin Li films having holes, is shown in FIG. 18B. In example C1, the area of the ultra-thin Li films having holes pre-loaded on one side of negative electrode is about 77.1% of the area of the negative electrode. The percentage of total area of 15 holes in each piece of the ultra-thin Li films having holes pre-loaded on surface of negative electrode is about 18.8%. The mass per unit area of the ultra-thin Li films having holes loaded onto one side surface of the NE in example C1 is 0.17 mg/cm$^2$. The mass ratio of Li sources loaded to NE active layer weight is about 10,2% as shown in TABLE 2.

Results and Discussion

The summary of the cell components and parameters for LIC cell C1 is shown in FIG. 19 representing TABLE 2 described below and the results of the evaluation are also in FIG. 20 representing TABLE 3 described below.

The LIC cell and the method of making said LIC cell, shown in the drawings and described in detail herein, disclose arrangements of elements of particular construction and configuration for illustrating preferred embodiments of structure and method of operation of the present invention. It is to he understood however, that elements of different construction and configuration and other arrangements thereof, other than those illustrated and described may be employed for providing a LIC cell and the method of making said LIC cell, in accordance with the spirit of the invention, and such changes, alternations and modifications as would occur to those skilled in the art are considered to be within the scope of this invention as broadly defined in the appended claims.

Summary

As all test results have been concluded in Table 2 and Table 3, it can be summarized that LIC cells using ultra-thin lithium films having holes can achieve relatively higher power and energy properties and better cycle life. LIC with lithium strips can also achieve stable results. However, using graphite as NE materials may results in poor cycle and DC life, characterization. This is due to the material properties. What's more, the ratio of PE/NE active layer thickness and capacity can also affect cell performance. Higher thickness ratio (3:1) of PE to NE active layers results in higher energy density but a shorter lifetime and lower ratio (1.1:1) improves it. Capacity ratio of PE:NE active layers will also influence the cell electrochemical performance. During the electrode fabrication, various active and binder materials were used in the process, which results in different electrode strength and materials' surface and interfaces properties. And this difference can change the cell performance accordingly. Cell with Elite-C/PTFE has the worst cycle life and DC life. After comparison, hard carbon will be preferred to be used as NE materials and ultra-thin lithium films having holes will be used as pre-lithiation Li source for LICs. CEP21KS will be chosen as PE active materials and inside will use SBR/CMC or PTFE as the binder in order to get a better cycle life and DC life. In the meantime, PE/NE active layer ratio should be around 1.1:1 according to our comparison. If the energy density should be improved and life performance can be sacrificed, higher ratio should be considered in the LIC cells. Ultra-thin (<1 mm thickness) LIC cell C1 based on ultra-thin (<50 μm) electrodes has the lowest RC constant which is about 0.6 s with excellent cycle and DC life performance. This type of cell can be applied into ultra-high pulse applications etc.

The LIC cell and the method of making said LIC cell, shown in the drawings and described in detail herein, disclose arrangements of elements of particular construction and configuration for illustrating preferred embodiments of structure and method of operation of the present invention. It is to be understood however, that elements of different construction and configuration and other arrangements thereof, other than those illustrated and described may be employed for providing a LIC cell and the method of making said LIC cell, in accordance with the spirit of the invention, and such changes, alternations and modifications as would occur to those skilled in the art are considered to be within the scope of this invention as broadly defined in the appended claims.

Further, the purpose of the foregoing abstract is to enable the US Patent and Trademark Office and the public generally, and especially the scientists, engineers and practitioners in the art who are not familiar with patent or legal terms or phraseology, to quickly determine from a cursory inspection, the nature and essence of the technical disclosure of the application. The abstract is neither intended to define the invention of the application, which is measured by the claims, nor is it intended to be limiting as to the scope of the invention in any way.

We claim:

1. A lithium ion capacitor, comprising:
   (a) positive electrodes:
   (b) negative electrodes wherein the surfaces of said negative electrodes are pre-loaded with lithium sources, including lithium strips and ultra-thin lithium films and further wherein said lithium sources include lithium sources having holes therein;
   (c) separators; and
   (d) an organic solvent electrolyte with lithium salt.

2. The lithium ion capacitor according to claim 1, wherein said positive electrodes include active material and further wherein said active material includes activated carbon (AC).

3. The lithium ion capacitor according to claim 2, wherein said positive electrode active material activated carbon has a surface area in a range from 1000 to 3000 m$^2$/g and a particle size that satisfies a diameter of 50% accumulated volume (D50) within a range of 1 µm<$D_{50}$≤8 µm.

4. The lithium ion capacitor according to claim 1, wherein said positive electrodes include active material and further wherein said active material includes carbon black.

5. The lithium ion capacitor according to claim 1, wherein said positive electrodes include active material and further wherein said active material includes activated carbon/carbon black mixed (AC/CB) and the mass ratio of AC:CB is from 90:10 to 99:1.

6. The lithium ion capacitor according to claim 1, wherein said positive electrodes include binders and further wherein said binders include polytetrafluoroethylene (PTFE) and the mass ratio of activated carbon (AC) to PTFE is in a range from 88:12 to 98:2.

7. The lithium ion capacitor according to claim 1, wherein said positive electrodes include binders and further wherein said binders include styrene butadiene rubber (SBR) and carboxymethyl cellulose (CMC) and the mass ratio of SBR to CMC is in a range from 3:1 to 1:3.

8. The lithium ion capacitor according to claim 1, wherein said positive electrodes include binders and further wherein said binders include styrene butadiene rubber (SBR) and carboxymethyl cellulose (CMC) and the mass ratio of SBR to CMC is from 3:1 to 1:3 and the ratio of the total mass of AC and CB to the total mass of SBR and CMC is from 85:15 to 98:2.

9. The lithium ion capacitor according to claim 1, wherein said negative electrodes include active material and further wherein said active material includes hard carbon, soft carbon and graphite.

10. The lithium ion capacitor according to claim 9, wherein said active material in said negative electrode has a particle size that satisfies a diameter of 50% accumulated volume (D50) within a range of 1 µm≤$D_{50}$≤10 µm.

11. The lithium ion capacitor according to claim 1, wherein said negative electrodes include binders and further wherein said hinders include styrene butadiene rubber (SBR) and carboxymethyl cellulose (CMC) and the mass ratio of SBR to CMC is in a range from 3:1 to 1:3 and the ratio of mass of negative electrode active material to the total mass of SBR and CMC is in a range from 90:10 to 98:2.

12. The lithium ion capacitor according to claim 1, wherein the total thickness of the positive electrode includes the thickness of a double-side conductive material pre-coated aluminum foil and the thickness of said double-side active material layers, is about 40 µm to 450 µm.

13. The lithium ion capacitor according to claim 1, wherein the total thickness of the negative electrode includes the thickness of copper foil and the thickness of the double-side active material layers is about 20 µm to 350 µm.

14. The lithium ion capacitor according to claim 1, wherein the thickness ratio of the total thickness of positive electrode active layers to the total thickness of the negative electrode active layers is from 1:2 to 3:1.

15. The lithium ion capacitor according to claim 1, wherein the capacity ratio of the positive electrode active layers charge-discharge from 3.8 V to 2.2 V to the negative electrode active layers is in a range from 1:12 to 1:2.

16. The lithium ion capacitor according to claim 1, wherein the material of the separator is cellulose, polypropylene (PP) and a polyethylene (PE) based material.

17. The lithium ion capacitor according to claim 1, wherein the mass per unit area of said lithium sources, including lithium strips and ultra-thin lithium films having holes loaded onto one side of the negative electrode, is in a range from 0.1 mg/cm$^2$ to 3 mg/cm$^2$.

18. The lithium ion capacitor according to claim 1, wherein the thickness of said lithium sources including, lithium strips and ultra-thin lithium films, having holes loaded on to one side surface of the negative electrode is in a range from 2 µm to 50 µm.

19. The lithium ion capacitor according to claim 1, wherein the number of said lithium strips as a lithium source loaded on one side surface of the negative electrode is in a range from 2 to 10.

20. The lithium ion capacitor according to claim 1, wherein the area of said ultra-thin lithium films having holes, as a lithium source loaded on one side surface of negative electrode, is about 25% to about 100% of the area of the negative electrode.

21. The lithium ion, capacitor according to claim 20, wherein the area size percentage range of said holes in said ultra-thin lithium films having holes, as a lithium source loaded on the surface of said negative electrodes is from 0.01% to about 75%.

22. The lithium ion capacitor according to claim 1, wherein the mass ratio percentage of the lithium sources including lithium strips and ultra-thin lithium films, having holes loaded onto one side surface of the negative electrode, to the one side negative electrode active layer is from 7% to 14%.

23. An ultra-thin lithium ion capacitor, comprising:
(a) two ultra-thin single-sided positive electrodes having a thickness of ≤50 μm;
(b) one ultra-thin double-sided negative electrode having a thickness of ≤50 μm pre-loaded on the surfaces of said negative electrode with ultra-thin lithium films and further wherein said ultra-thin lithium films include ultra-thin lithium films having holes therein;
(c) separators; and
(d) an organic solvent electrolyte with lithium salt;
wherein said ultra-thin lithium-ion capacitor has an overall thickness of ≤1 mm.

24. The ultra-thin lithium ion capacitor according to claim 23, wherein said positive electrodes include active material and said active material includes activated carbon (AC).

25. The ultra-thin lithium ion capacitor according to claim 23, wherein said positive electrode active material is activated carbon and has a surface area in a range from 1000 to 3000 m$^2$/g and a particle size of that satisfies a diameter of 50% accumulated volume (D50) within a range of 1 μm≤$D_{50}$≤8 μm.

26. The ultra-thin lithium ion capacitor according to claim 23, wherein said positive electrodes include active material and said active material includes activated carbon/carbon black mixed (AC/CB) and the mass ratio of AC to CB is from 90:10 to 99:1.

27. The ultra-thin lithium ion capacitor according to claim 23, wherein said positive electrodes include binders and further wherein said binders include styrene butadiene rubber (SBR) and carboxymethyl cellulose (CMC) and the mass ratio of SBR to CMC is from 3:1 to 1:3.

28. The ultra-thin lithium ion capacitor according to claim 23, wherein said positive electrodes include binders and further wherein said binders include styrene butadiene rubber (SBR) and carboxymethyl cellulose (CMC) and the mass ratio of SBR to CMC is in a range from 3:1 to 1:3 and the ratio of the total mass of AC and CB to the total mass of SBR and CMC is in a range from 85:15 to 98:2.

29. The ultra-thin lithium ion capacitor according to claim 23, wherein said negative electrode includes active material and further wherein said active material includes hard carbon, soft carbon and graphite.

30. The ultra-thin lithium ion capacitor according to claim 29, whereon said active material in negative electrode has a particle size that satisfies a diameter of 50% accumulated volume (D50) within a range of 1 μm≤$D_{50}$≤10 μm.

31. The ultra-thin lithium ion capacitor according to claim 23, wherein said negative electrode include binders and said binders include styrene butadiene rubber (SBR) and carboxymethyl cellulose (CMC) and the mass ratio of SBR to CMC is in a range from 3:1 to 1:3 and the ratio of mass of negative electrode active material to the total mass of SBR and CMC is in a range from 90:10 to 98:2.

32. The ultra-thin lithium ion capacitor according to claim 23, wherein the thickness ratio of the total thickness of the positive electrode active layers to the total thickness of the negative electrode active layers is in a range from 1:2 to 3:1.

33. The ultra-thin lithium ion capacitor according to claim 23, wherein the capacity ratio of the positive electrode active layers charge-discharge from 3.8 V to 2.2 V to the negative, electrode active layers is in a range from 1:12 to 1:2.

34. The ultra-thin lithium ion capacitor according to claim 23, wherein the material of the separator is cellulose, polypropylene (PP) and a polyethylene (PE) based material.

35. The ultra-thin lithium ion capacitor according to claim 23, wherein the thickness of the ultra-thin lithium films having holes loaded on to one side surface of the negative electrode is in a range from 2 μm to 20 μm.

36. The ultra-thin lithium ion capacitor according to claim 23, wherein the area of said ultra-thin lithium films having holes used as a lithium source loaded on one side surface of negative electrode is about 25% to about 100% of the area of the negative electrode.

37. The ultra-thin lithium ion capacitor according to claim 23. wherein the area size percentage range of said holes in said ultra-thin lithium films having holes as lithium source loaded on surface of said negative electrode is in a range from 0.01% to about 75%.

38. The ultra-thin lithium ion capacitor according to claim 23, wherein the mass ratio percentage of the ultra-thin lithium films having holes loaded onto one side surface of the negative electrode to the one side negative electrode active layer is from 7% to 14%.

* * * * *